(12) United States Patent
Horvath et al.

(10) Patent No.: US 11,288,143 B2
(45) Date of Patent: Mar. 29, 2022

(54) REAL-TIME FAULT-TOLERANT CHECKPOINTING

(71) Applicant: STRATUS TECHNOLOGIES IRELAND LTD., Dublin (IE)

(72) Inventors: Charles J. Horvath, Jamaica Plain, MA (US); Lei Cao, Westford, MA (US)

(73) Assignee: STRATUS TECHNOLOGIES IRELAND LTD., Dublin (IE)

(*) Notice: Subject to any disclaimer, the term of this patent is extended or adjusted under 35 U.S.C. 154(b) by 0 days.

(21) Appl. No.: 17/003,808

(22) Filed: Aug. 26, 2020

(65) Prior Publication Data

US 2022/0066887 A1 Mar. 3, 2022

(51) Int. Cl.
*G06F 11/00* (2006.01)
*G06F 11/14* (2006.01)
(Continued)

(52) U.S. Cl.
CPC ...... *G06F 11/1471* (2013.01); *G06F 11/1446* (2013.01); *G06F 11/1464* (2013.01);
(Continued)

(58) Field of Classification Search
CPC ............ G06F 11/1446; G06F 11/1464; G06F 11/1466; G06F 11/1471; G05B 2219/25174; G05B 2219/31135; G05B 2219/31188; G05B 2219/31145; G05B 2219/31189
See application file for complete search history.

(56) References Cited

U.S. PATENT DOCUMENTS 6,298,454 B1 * 10/2001 Schleiss ............ G05B 23/0227
714/37
6,355,991 B1 3/2002 Goff et al.
(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
(Continued)

*Primary Examiner* — Michael Maskulinski
(74) *Attorney, Agent, or Firm* — K&L Gates LLP

(57) ABSTRACT

In part, the disclosure relates to a real-time fault tolerant system. The system may include a first computing device, a second computing, and a hardware interconnect. The first computing device may include one or more memory devices, one or more processors, a first network interface operable to receive device data and transmit output data over a time-slot-based bus, wherein the output data is generated from processing device data, and a first real-time checkpoint engine. The second computing device may include similar components or the same components as the first computing device. The hardware interconnect is operable to permit data exchange between the first computing device and the second computing device. Checkpoints may be generated by checkpoint engines during lower-priority communication time slots allocated on the time slot-based bus to avoid interfering with any real-time communications to or from the first and second computing devices.

29 Claims, 13 Drawing Sheets

(51) Int. Cl.
*G06F 11/20* (2006.01)
*G06F 13/40* (2006.01)

(52) U.S. Cl.
CPC ...... *G06F 11/1466* (2013.01); *G06F 11/2028* (2013.01); *G06F 13/4027* (2013.01); *G06F 2201/805* (2013.01); *G06F 2201/84* (2013.01)

(56) References Cited

U.S. PATENT DOCUMENTS

| | | | |
|---|---|---|---|
| 6,633,996 B1 | 10/2003 | Suffin et al. | |
| 6,687,851 B1 | 2/2004 | Somers et al. | |
| 6,691,225 B1 | 2/2004 | Suffin | |
| 6,691,257 B1 | 2/2004 | Suffin | |
| 6,708,283 B1 | 3/2004 | Nevin et al. | |
| 6,718,474 B1 | 4/2004 | Somers et al. | |
| 6,766,413 B2 | 7/2004 | Newman | |
| 6,766,479 B2 | 7/2004 | Edwards | |
| 6,802,022 B1 | 10/2004 | Olson | |
| 6,813,721 B1 | 11/2004 | Tetreault et al. | |
| 6,842,823 B1 | 1/2005 | Olson | |
| 6,862,689 B2 | 3/2005 | Bergsten et al. | |
| 6,874,102 B2 | 3/2005 | Doody et al. | |
| 6,886,171 B2 | 4/2005 | MacLeod | |
| 6,928,583 B2 | 8/2005 | Griffin et al. | |
| 6,970,892 B2 | 11/2005 | Green et al. | |
| 6,971,043 B2 | 11/2005 | McLoughlin et al. | |
| 6,996,750 B2 | 2/2006 | Tetreault | |
| 7,065,672 B2 | 6/2006 | Long et al. | |
| 7,496,786 B2 | 2/2009 | Graham et al. | |
| 7,496,787 B2 | 2/2009 | Edwards et al. | |
| 7,669,073 B2 | 2/2010 | Graham et al. | |
| 7,904,906 B2 | 3/2011 | Puthukattukaran et al. | |
| 7,958,076 B2 | 6/2011 | Bergsten et al. | |
| 8,117,495 B2 | 2/2012 | Graham | |
| 8,161,311 B2 | 4/2012 | Wiebe | |
| 8,234,521 B2 | 7/2012 | Graham et al. | |
| 8,271,416 B2 | 9/2012 | Al-Biek et al. | |
| 8,312,318 B2 | 11/2012 | Graham et al. | |
| 8,381,012 B2 | 2/2013 | Wiebe | |
| 8,812,907 B1 | 8/2014 | Bissett et al. | |
| 9,251,002 B2 | 2/2016 | Manchek et al. | |
| 9,588,844 B2 | 3/2017 | Bissett et al. | |
| 9,652,338 B2 | 5/2017 | Bissett et al. | |
| 9,760,442 B2 | 9/2017 | Bissett et al. | |
| 10,185,628 B1 * | 1/2019 | Snyder | G06F 11/1451 |
| 10,216,598 B2 | 2/2019 | Haid et al. | |
| 10,360,117 B2 | 7/2019 | Haid et al. | |
| 2001/0042202 A1 | 11/2001 | Horrath et al. | |
| 2002/0016935 A1 | 2/2002 | Bergsten et al. | |
| 2002/0070717 A1 | 6/2002 | Pellegrino | |
| 2003/0046670 A1 | 3/2003 | Marlow | |
| 2003/0095366 A1 | 5/2003 | Pellegrino | |
| 2006/0222125 A1 | 10/2006 | Edwards et al. | |
| 2006/0222126 A1 | 10/2006 | Edwards et al. | |
| 2006/0259815 A1 | 11/2006 | Graham et al. | |
| 2006/0274508 A1 | 12/2006 | LaRiviere et al. | |
| 2007/0011499 A1 | 1/2007 | Begsten et al. | |
| 2007/0028144 A1 | 2/2007 | Graham et al. | |
| 2007/0038891 A1 | 2/2007 | Graham | |
| 2007/0106873 A1 | 5/2007 | Lally et al. | |
| 2007/0174484 A1 | 7/2007 | Lussier et al. | |
| 2009/0249129 A1 | 10/2009 | Femia | |
| 2011/0173488 A1 * | 7/2011 | Blumrich | G06F 11/1438 714/4.1 |
| 2015/0205688 A1 | 7/2015 | Haid et al. | |
| 2015/0263983 A1 | 9/2015 | Brennan et al. | |
| 2017/0324609 A1 | 11/2017 | Hong et al. | |
| 2018/0046480 A1 | 2/2018 | Dong et al. | |
| 2018/0143885 A1 | 5/2018 | Dong et al. | |
| 2019/0266056 A1 * | 8/2019 | Wu | G06F 9/4887 |
| 2020/0050523 A1 | 2/2020 | Pawlowski et al. | |
| 2021/0034447 A1 | 2/2021 | Horvath et al. | |
| 2021/0034464 A1 | 2/2021 | Dailey et al. | |
| 2021/0034465 A1 | 2/2021 | Haid et al. | |
| 2021/0034483 A1 | 2/2021 | Haid | |
| 2021/0034523 A1 | 2/2021 | Dailey | |
| 2021/0037092 A1 | 2/2021 | Cao | |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

REAL-TIME FAULT-TOLERANT CHECKPOINTING

BACKGROUND

Checkpointing technology is a means to achieve fault tolerant behavior of computer systems. Current checkpointing technology, either virtualization-based or OS-based, is incompatible with hard real-time operation in that a checkpoint can be required to occur at any point in time, thereby impacting the system response time and causing a missed a deadline.

Applications and systems requiring both real-time support and fault-tolerant operation are currently designed with custom software and/or hardware. They are bespoke and tailored for particular industries and purposed. This requires significant expense and time to develop, deploy, and maintain such a system.

The disclosure provides systems and methods of providing real-time fault tolerance suitable for use in various industries and support levels, while addressing the challenges associated with checkpointing noted above.

SUMMARY

In part, the disclosure relates to a real-time fault tolerant computing system. The system may include a first computing device, a second computing, and a hardware interconnect. The first computing device may include one or more memory devices, one or more processors, a first network interface operable to receive device data and transmit output data over a time-slot-based bus, wherein the output data is generated from processing device data, and a first real-time checkpoint engine. The second computing device may include one or more memory devices, one or more processors, a second network interface operable to receive device data over the time slot-based bus, and a second real-time checkpoint engine. In one embodiment, the hardware interconnect is operable to permit data exchange between the first computing device and the second computing device. In one embodiment, checkpoints are generated by the first or the second real-time checkpoint engines during lower-priority communication time slots allocated on the time slot-based bus to avoid interfering with any real-time communications to or from the first and second computing devices.

In one embodiment, the first computing device and the second computing device simultaneously process received device data such that if the first computing device experiences a failure the second computing device continues processing device data to generate the output data and transmit the output data using the time slot-based bus. In one embodiment, checkpoint operations are always postponed until the occurrence of a lower-priority communication slot, even upon the first computing device and the second computing device producing divergent output data prior to the lower-priority communication slot occurring. In one embodiment, the first computing device and the second computing device both delay release of output data to one or more devices in communication with the time-slot based bus until after a subsequent checkpoint to avoid release of divergent output data should a failure occur.

In one embodiment, the first computing device generates checkpoints on a per cycle basis when output data includes low priority data is transmitted using a low priority time slot. In one embodiment, the device is a sensor and the output data includes sensor data, the sensor data is operable as an input for a control system. In one embodiment, the first computing device and the second computing device are both actively processing device data and producing output data so that if the first computing device experiences one or more failure modes a time delay for second processing device to continue processing is about zero or zero.

In one embodiment, the duration of one or more time slots is increased by a detection period, wherein the detection period ranges from about 1 microsecond to about 100 microseconds. In one embodiment, the first computing device and the second computing device both delay release of output data to devices in communication with the time-slot based bus until after the next checkpoint to avoid release of inconsistent output data. In one embodiment, if the first computing device is operating normally after a checkpoint, the first computing device releases any delayed output data. In one embodiment, the first computing device transmits all of its output data to the second computing device to avoid such output data being dropped upon occurrence of a failure of the first computing device.

In one embodiment, if the first computing device fails, the second computing device takes over release of the first computing device's output data that was generated during the last checkpoint. In one embodiment, only the first computing device handles release of output data when no failures have occurred and in parallel shares such output data with the second computing device. In one embodiment, the device data from one or more devices are transmitted to the first computing device and the second computing device over the time slot-based bus. In one embodiment, the first computing device and the second computing device receive incoming data directly through a broadcast or a multicast.

In one embodiment, each of the first computing device and the second computing device include a respective non-virtual operating system (OS) that includes a respective network driver, checkpoint shim, and storage driver stored in the one or more memory devices and executing on each of the one or more processors. In one embodiment, the network driver includes a replicator in communication with a release coordinator and a release notifier. In one embodiment, the one or more networking programs stored in the one or more memory devices of the first and second computing devices delay and coordinate transmission of output data using one or more of the hardware interconnect, the first network interface and the second network interface. In one embodiment, each of the first computing device and the second computing device include a respective virtual operating system (OS) that includes one or more respective network support applications, a checkpoint engine, and one or more storage support applications stored in the one or more memory devices and executing with respective hypervisors. In one embodiment, checkpoints are transmitted using the hardware interconnect.

In part, the disclosure relates to a method of controlling an operational system in real-time. The method may include receiving device data, at a primary node and a secondary node, from one or more devices in electrical communication with a time slot-based bus, wherein the bus is operable to receive data according to time slots of two or more priority levels; during a first time slot, generating a checkpoint at primary node and transmitting the checkpoint data to secondary node, wherein the first time slot is a lower priority time slot; generating an output data at the primary node and the secondary node in response to processing the received device data; and transmitting, from the primary node, the output data over the bus using a second time slot, wherein the second time slot is a higher priority time slot, wherein both the first node and the second node are in an active mode.

In one embodiment, the method further includes transmitting data during a non-checkpoint portion of a lower priority time slot. In one embodiment, the method further includes gating network data using a respective network software module executing on both the primary and the secondary node such that output data is released from the node whose state has carried forward to current checkpoint. In one embodiment, the method further includes synchronizing transmission of output data with high priority time slots, wherein the output data is received by the operational system.

In one embodiment, the method further includes transmitting data during a non-checkpoint portion of a lower priority time slot. In one embodiment, the method further includes using the primary node, all of its respective outgoing data to the secondary node to avoid such outgoing data from being dropped upon occurrence of a failure of the primary node. In one embodiment, the checkpoint data is transmitted using a hardware interconnect.

Selectively releasing data such that it is synchronized with a time slot having a priority level that matches that or is otherwise compatible with that of the data to be transmitted using a timeslot based-bus is performed in various embodiments of the disclosure. In addition, the transmission of data using the hardware interconnect that is processor/computing device intensive such as, for example, one or more stages of a checkpoint are transmitted during low priority timeslots on the timeslot-based bus. In various embodiments, the hardware interconnect is a separate communication channel from the timeslot-based bus.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1A:
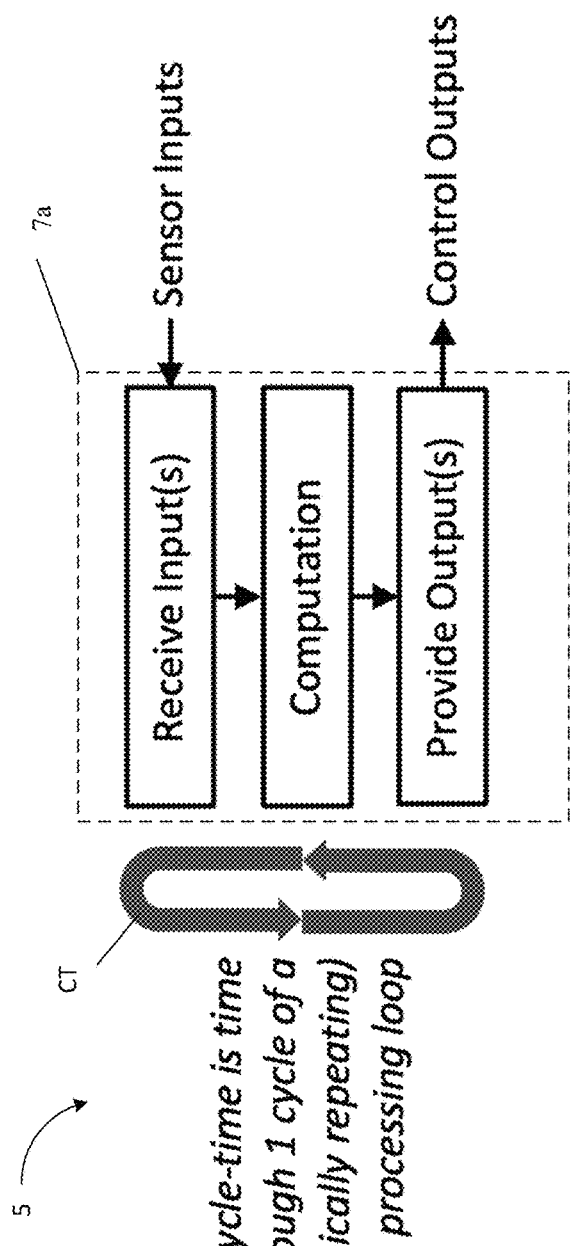
FIG. 1A is a schematic diagram of an exemplary cyclic real-time system that may be implemented using the fault tolerant features disclosed herein.

In part the disclosure relates to various systems and methods of real-time fault tolerant computing. A real-time computer system provides guaranteed response times, that is time from an input or inputs to an output or response from the computer system is guaranteed by system design not to exceed a predetermined amount. This predetermined amount of time is often called a deadline. There are multiple levels of real-time support, including hard real-time support and soft real-time support. Various embodiments of the disclosure implement real-time checkpointing in concert with a timeslot-based bus to process device data, such as from sensors and other devices such as computing devices, and generate output data to control actuators or otherwise generate inputs for control systems and other systems, devices, and components as may be applicable for a given use case or implementation.

In the context of hard real-time support, missing a deadline results in a total system failure. Hard real-time support is used when a failure to meet a specified deadline can lead to catastrophic consequences. Examples include, without limitation, chemical plant processes, nuclear power station control, railway signal control, avionics fly-by-wire, and automotive engine control. Conversely, in the context of soft real-time support, the usefulness of a result degrades after its deadline, thereby degrading the system's quality of service. Examples include, without limitation, a computer sound system for which missed deadlines may cause some audio distortion, a computer gaming system for which missed deadlines may cause some delays in player action, or telephone switch systems for which a missed deadline may result in failure to initiate a call. The various systems and methods disclosed herein may be used for either hard real-time support or soft real-time support.

This disclosure describes a checkpointing based solution for achieving application transparent real-time fault-tolerant operation which can run on standard (commodity) computer systems. Use of this system achieves significant cost and time savings as compared to purpose designed solutions with custom software and/or hardware. In part, the disclosure relates to various checkpointing based systems which provides application transparent hard real-time fault-tolerant operation which can run on standard (commodity) computer systems. These systems offer various enhancements relating to checkpointing.

Conventional checkpointing is virtualization-based. Specifically, it is a means to achieve virtual machine (VM) level fault tolerant operation by periodically stopping a VM, capturing its state, and replicating the captured state on a second VM so that the second VM can continue operation should the first VM fail. The process of stopping a VM, capturing its state, and replicating the state to another VM is called a checkpoint. Checkpointing VMs is called virtualization-based or hypervisor-based checkpointing.

It is also possible to implement checkpointing at the OS level, i.e. in OS drivers rather than in a hypervisor. The various, systems, methods, combinations thereof, and other embodiments described in this disclosure applies equally well to virtualization-based and OS-based checkpointing.

Generally, improving upon checkpointing-based approaches in fault tolerant systems along with the use of timeslot prioritization for device data and selecting low priority timeslots for checkpointing are some of the features used to implement real-time fault tolerant systems and methods. With the foregoing as a high-level introduction, it is useful to consider checkpointing in more detail.

Checkpointing is a technique to keep a pair of virtual machines (VMs) or operating systems (OSs) at sufficiently the same state so that if one VM or OS fails the other VM or OS can continue the failed VM's or OS's operation essentially transparently to client systems. To achieve nonstop service, also called fault tolerance (FT), checkpointing deploys the pair of redundant VMs or OSs on separate physical servers so that if one physical server fails, the VMs or OSs and applications continue to run on the remaining physical server.

Checkpointing is necessitated by the fact that modern multi-threaded or multi-core computer systems do not execute deterministically. Two computers receiving the same input data will not execute the same instruction streams and hence may produce different output data (or output data timing) due to various factors. For example, hardware interrupts not being received at the exact same point in the instruction stream on both computers may ultimately cause processes to be scheduled differently between the two computers. In addition, disk response time differences (rotational latency variations for rotational drives, and garbage collection/remapping activity variations for solid-state drives) may ultimately lead to processes being scheduled differently on the two computers. Furthermore, general non-deterministic processor behavior such as thermal throttling, different cache hit/miss behavior due to earlier instruction/data accesses, non-precise alignment of fine granularity clocks and counters, etc., may ultimately lead to processes being scheduled differently on the two computers. Checkpointing periodically brings a pair of (non-deterministic) OSs or VMs back to the same effective state, so should an OS or VM fail, the partner is able to resume operation for the other transparently to external client systems.

At a high level, checkpointing periodically stops a running VM or OS, captures its state, and sends the state (or state changes) to a partner VM or OS, keeping the partner VM or OS at a near equivalent state. In the case of virtualization-based checkpointing the checkpointing functionality is largely implemented within a hypervisor. In the case of OS-based checkpointing the checkpointing functionality is largely implemented within operating system drivers. The time a checkpointed VM or OS is running is called the run interval and the time a checkpointed VM or OS is stopped to capture state is called the checkpoint. The sum of these two intervals is called the epoch. Exemplary checkpoint epochs and run intervals are showed in the context of scheduling data for release on a TSB in FIGS. 4, 12A and 12B, which are discussed in more detail herein.

In the case of OS-based checkpointing the OS is largely stopped during the checkpoint, but portions of the OS associated with the checkpointing process continue to run during the checkpoint. Various embodiments of the disclosure may improve upon and/or leverage some of the features disclosed in co-pending application Ser. No. 16/900,909, entitled "OPERATING SYSTEM-BASED SYSTEMS AND METHOD OF ACHIEVING FAULT TOLERANCE", filed on Jun. 13, 2020, the entire disclosure of which is incorporated herein by reference.

Real-Time Overview

Real-time computer systems provide guaranteed response times, that is time from an input or inputs to an output or response from the computer system is guaranteed by system design not to exceed a predetermined amount. This predetermined amount of time is called a deadline. FIG. 1A is a schematic diagram of an exemplary cyclic real-time system 5 that may be implemented using the fault tolerant features disclosed herein. Many real-time systems operate in a cyclic fashion, that is inputs are received and outputs are supplied at a repeating fixed interval. That fixed interval is called the cycle time (CT). The real-time fault tolerant system 7a receives sensor inputs such as from various devices, including sensors, and generates outputs such as control outputs. The control outputs can be used to control various devices such as actuators and other controllers. The real-time fault tolerant system 7a is operable to implement real-time checkpointing using a virtualized approach or an operating system (OS) based approach.

Figure 1B:
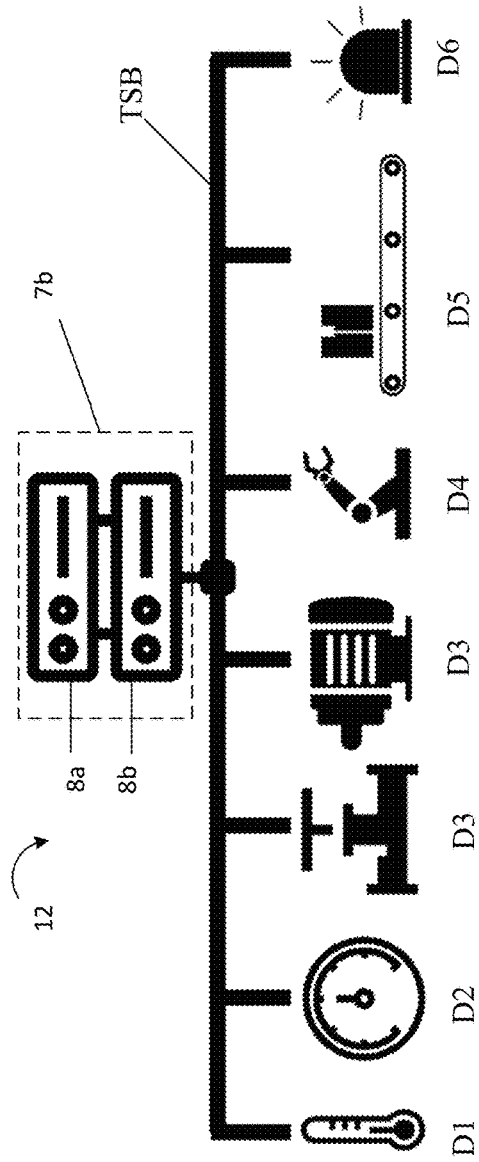
FIG. 1B is a schematic diagram of various devices in communication with a real-time fault tolerant system that shares a bus with various devices in accordance with an embodiment of the disclosure.

In industrial and process control environments, the communication medium connecting a controlling computer system and the sensors, actuators, valves, and other entities is often a shared bus. As shown in FIG. 1B, the overall manufacturing system 12 has various devices that are in communication with a shared bus. The shared bus shown is implemented using a timeslot-based bus (TSB). The various devices D1 through D7 correspond to a temperature sensor (D1), a gauge (D2), a valve (D3), a motor (D4), a robotic arm (D5), a conveyor belt (D6), and an alarm (D7). Devices D1 and D2, the temperature sensor and gauge, may serve as sensors that provide sensor inputs to the RT/FT system 7b. As shown, the system 7b typically includes a first computing device 8a and a second computing device 8b that are connected to each other and the TSB. The valve D3, motor D4, robotic arm D5, conveyor belt D6 and alarm D7 may be controlled based on the control outputs (output data) generated by the system 7b in response to the sensor inputs from devices D1 and D2. In turn, the alarm D7 may also serve as an input and an output with the alarm state of device D7 being fed back to the system 7b to regulate other device or to continuously indicate that everything is working according to acceptable levels.

Many real-time control systems use a shared communication medium such as Ethernet for the TSB embodiment shown in FIG. 1B. For simplicity of presentation the TSB in FIG. 1B is illustrated as connecting directly to devices (D1 to D7), in practice there is often an intervening electronic component between the device and field bus, typically a PLC (programmable logic controller). Various edge computing devices may also be connected to TSB in various embodiments. The real-time fault tolerant system 7b is operable to implement real-time checkpointing using a virtualized approach or an operating system (OS) based approach. The computing devices, such as a first computing device 8a and a second computing device 8b include network connections such that both devices receive device data through the TSB from one or more (or all) of the devices D1-D7.

To maintain real-time behavior with a shared bus, processes are implemented to prevent various computing devices that access the bus from simultaneously communicating on the shared bus. In part, the disclosure relates to protocols and other safeguards to prevent simultaneous access to the shared bus or otherwise sending data such as checkpoint data during high priority timeslots. Failure to implement such safeguards results in non-deterministic communication delays which in turn could cause real-time deadlines to be violated.

In various embodiments, avoiding communication conflicts on a shared medium such as a shared bus is to time-slice the communication medium. In various embodiments, the real-time fault tolerant systems disclosed herein allocate pre-assigned timeslots within a processing loop cycle or other period or cycle for each communicating entity on the shared bus. Examples of time-sliced communication buses include, without limitation, ProfiNET IRT, CC-Link IE Field, Foundation Fieldbus, and Ethernet POWERLINK. Various TSBs are operable to send and receive data according to time slots having varying priority levels such as a high, medium, and low priority. Other more general priority levels may be used to manage how device data is scheduled relative to checkpoint data. A first priority level, a second priority level, a third priority level, etc. may be used to distinguish time slots to facilitate real-time checkpointing and avoiding conflicts that may result in errors that prevent real-time operation.

In various implementations, a timeslot-based bus is used to implement various real-time fault tolerant systems that collect data from sensors or others devices that have the capability to allocate specific timeslots for time critical communication and other time slots for non-time critical or less time critical communication. This permits the use of a shared communication medium fieldbus for non-deterministic communication without interfering with time critical communication on the same shared bus such as a TSB.

For some TSBs, a low priority time-sliced communication bus slots may be characterized as acyclic, meaning the communication during those slots is not constrained by cycle time driven deadlines. Various shared buses suitable for implementing the embodiments of the disclosure may include combinations of cyclic and acyclic features and timeslots such as timeslots having various levels of priority.

Time Sensitive Networking (TSN) Scheduled Traffic

As an exemplary TSB is informative to consider TSN (Time Sensitive Network) technology that may be used to implement various TSB configurations. TSN supports several methodologies for achieving bounded low-latency network data transport. These are now incorporated into IEEE 802.1Q-2018. Examples of TSN features may include one or more of the following Credit Based Shaper (formerly 802.1Qav), Preemption (formerly 802.3br & 802.1Qbu), Scheduled Traffic (formerly 802.1Qbv), Cyclic Q-ing & Fwd (formerly 802.1Qch), and Async Shaping (formerly P802.1Qcr).

Various embodiments of the disclosure may use suitable TSBs such as TSN scheduled traffic (IEEE802.1Qbv, a.k.a. TSN time-aware shaper, a.k.a. TSN time-aware scheduler) to illustrate real-time behavior. TSN is an example of a TSB suitable for use in various embodiments.

The TSN time-aware scheduler is a time-sliced cyclic bus based on ethernet functions. TSN is an ethernet based non-proprietary standard. References to using TSN for a shared-bus for the real-time systems and methods disclosed herein are provided as an illustrative example. The disclosure is not specific to TSN based networks and may work with any time-sliced cyclic bus as well as with other non-cyclic real-time solutions for which there are periodic time slots where a checkpoint can be taken without interfering with real-time activities. In general, embodiments of the disclosure may be implemented using a time-slot-based bus (TSB) such as for example a TSN-based bus or network and others disclosed herein or suitable for providing real-time functionality as disclosed herein.

Checkpointing and Real-Time Operation

In various aspects, the disclosure relates to real-time checkpointing and its role in supporting real-time fault tolerance. Existing legacy checkpointing solutions may be grouped into two classifications, active-passive checkpointing and active-active checkpointing. These existing legacy checkpointing technologies are described in more detail below. Real-time checkpointing is a different type of checkpointing than these legacy technologies. Real-time checkpointing addresses the shortcomings of active-passive checkpointing or active-active checkpointing which makes them unsuitable for real-time operation. Real-time checkpointing is a different type of checkpointing than active-passive checkpointing or active-active checkpointing. Real-time checkpointing addresses the shortcomings of active-passive checkpointing or active-active checkpointing and hence is suitable to real-time operation.

A high level illustrative example of a real-time system 7c is shown with a TSB as part of an overall control system 20. In that example, shown in FIG. 2, sensors 1 and 2, S1, S2, are providing real-time (RT) data to the real-time fault tolerant (RT/FT) checkpointing based system, labeled RT/FT, and the RT/FT system is processing that data to control the actuator A in real-time.

The sensors S1, S2 in the diagram can be a variety of devices (pressure sensors, flow sensors, speed sensors, fluid level sensors, proximity sensors, etc.) and have a variety of implementations. For example, the various devices D1 through D6 in system 5 of FIG. 1B may include various sensors and other devices. Various sensors and devices, suitable for use with the systems and methods disclosed herein may include, without limitation, a smart networked sensor; a networked PLC (programmable logic controller) connected to a sensor or sensors; a computer hosting virtualized PLCs connected to sensors; distribute Control Nodes (DCNs, industrial control devices with 10 and compute capabilities); combinations thereof, and others as disclosed herein or otherwise applicable to a given company's products and services. Similarly, the actuator can be a variety of device types and have a number of possible implementations.

If the sensors were position, proximity, and/or pressure devices associated with a robotic arm and the actuator represented the robotic arm's servo motors controlling the its movement, the sensors would be supplying data in real-time to the RT/FT system which is processing by the RT/FT to control the robotic arm's motions via the arm's servo motors.

Figure 2:
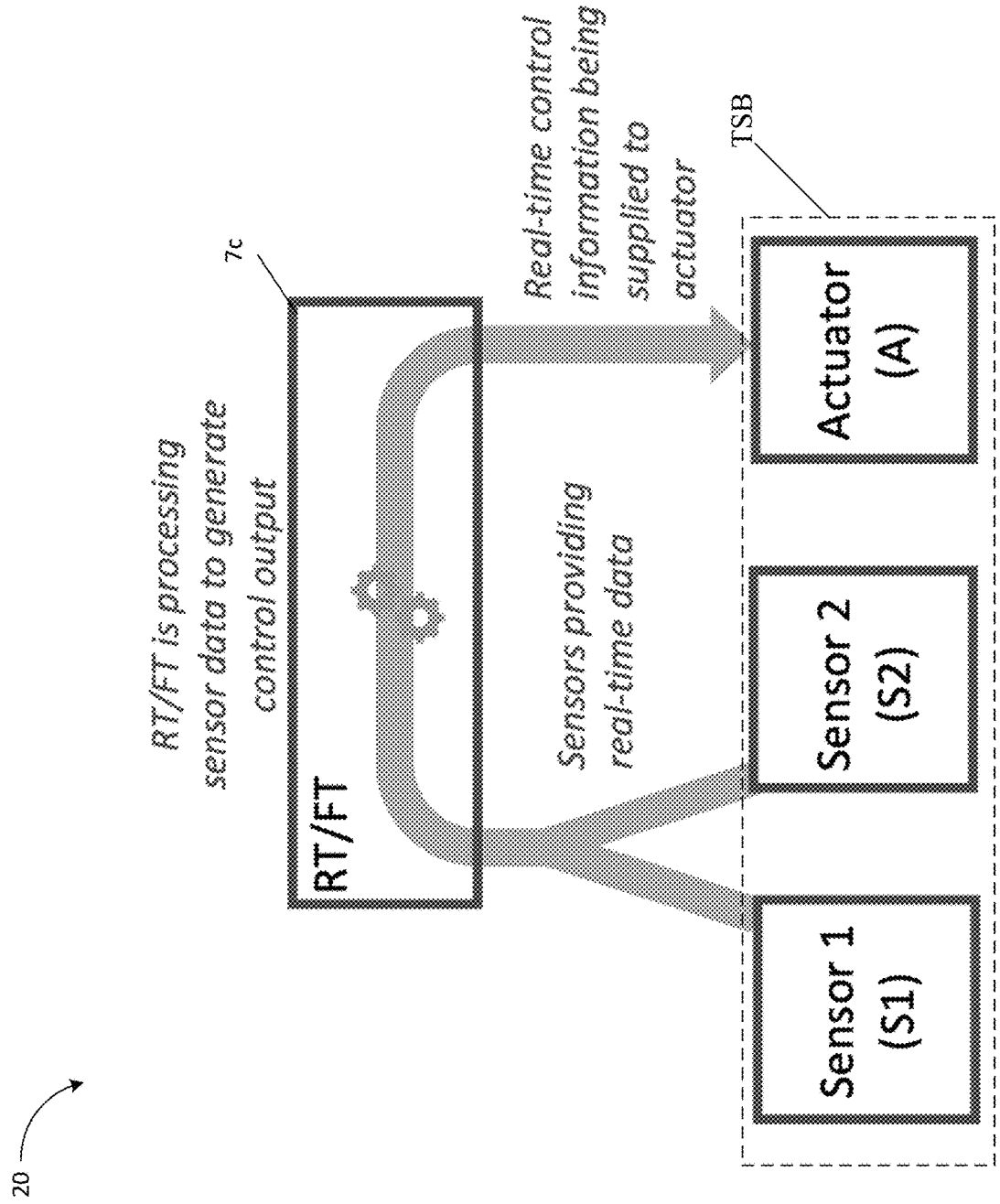
FIG. 2 is a schematic diagram of real-time fault tolerant system showing the path of real-time device data and output data in accordance with an embodiment of the disclosure.
Figure 3:
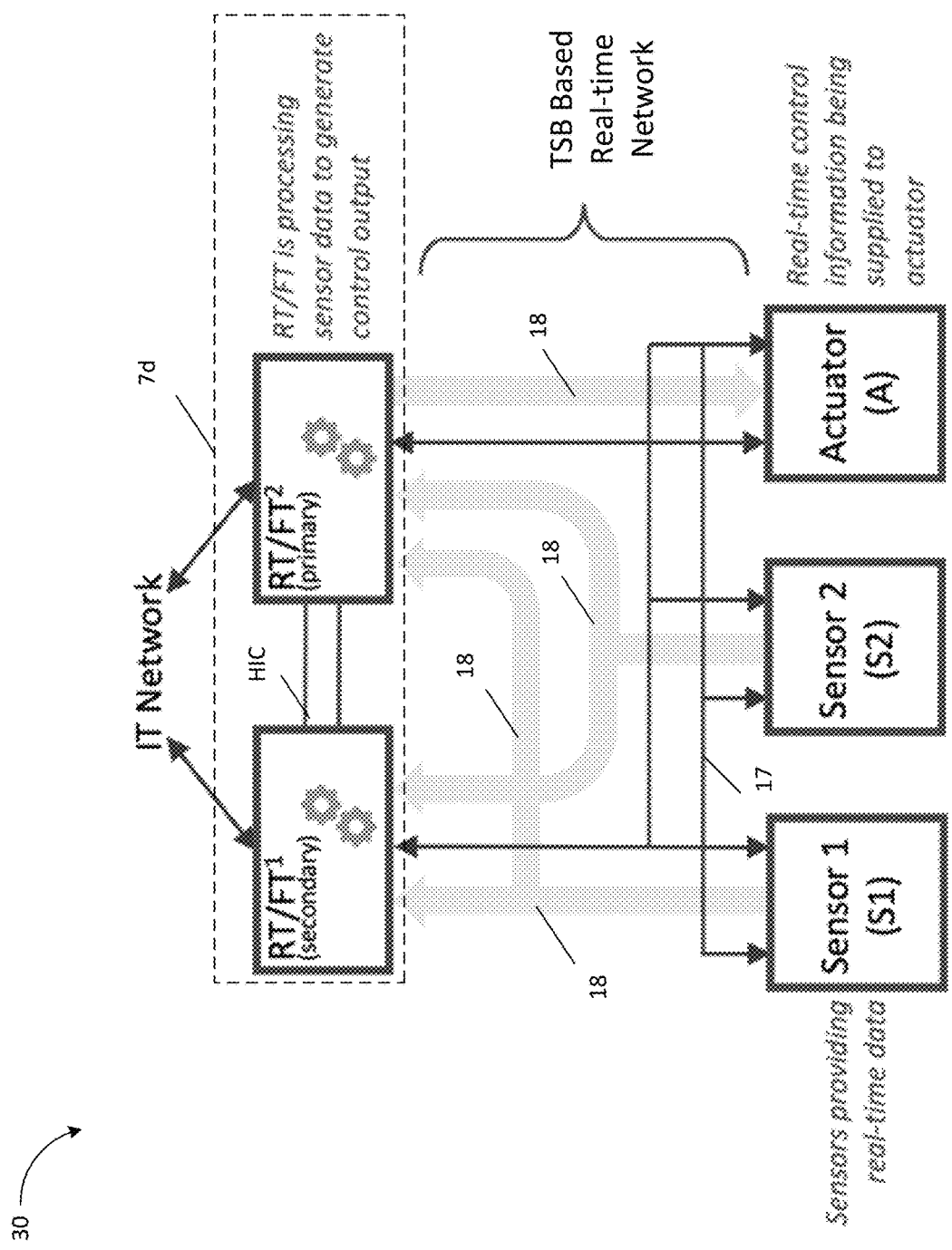
FIG. 3 is a schematic diagram of real-time fault tolerant system that includes a first computing device and a second computing device in accordance with an embodiment of the disclosure.

Still referring to FIG. 2, the two exemplary devices S1, S2 are shown along with an actuator A. In various embodiments, devices S1 and S2 are sensors that collect data relative to a system or process that is being monitored or controlled by the control system 20. Real-time device data from the sensors is being processed by the RT/FT 7c during one or more processing cycles and then relayed to the actuator as real-time control information. A given RT/FT may include a network interface to receive device data (such as sensor data) and transmit output data. The output data is generated from processing received device data and optionally other inputs and parameters that are specific to the process or system that is being controlled or monitored. The device data and output data are typically transmitted using a TSB. In the system of FIG. 2, the RT/FT is processing the data from S1 and S2 to generate output data such as real-time control information that will be transmitted to the actuator A to cause it to respond in a particular manner or perform a given task or take a particular action in response to the received output data. The RT/FT 7c is simplified in terms of the processing details and how one or more computing devices are configured to provide fault tolerance and a real-time implementation. FIG. 3 shows an exemplary RT/FT with more details and includes two computing devices.

The RT/FT system 7d of FIG. 3 includes two computing devices that may be identified as primary and secondary (or vice versa) or RT/FT$^1$ and RT/FT$^2$ (or vice versa). The RT/FT system 7d is part of an overall control system 30 that includes a TSB, S1, S2, and A. The devices/sensors S1 and S2 and the actuator A are the same as depicted in the system of FIG. 2, but additional details of their connections to the primary and secondary computing devices are shown. The two computing devices work in concert to implement the fault tolerant real-time checkpointing based system 7d. These computing devices may also be identified as first and second computing devices, servers, nodes, or other terms as disclosed herein. Notwithstanding the foregoing, a given first computing device may initially have a first role while the second computing device may have a second role. The first and second roles may switch or be changed to other roles if one of the computing devices experience an error or a failure mode.

The system of FIG. 3 includes a shared bus, such as a TSB, and also may include network connections to a network such as an information technology (IT) network of an enterprise, the internet, or other networks. Each of the computing devices RT/FT$^1$ and RT/FT$^2$ are connected by a hardware interconnect HIC. The sensors, actuator(s) and RT/FT systems are connected using redundant shared networks 17 represented by the thin dark lines. An exemplary data flow is illustrated by the wide light lines 18. The various arrow heads show the direction of data flows.

For the non-failure case corresponding to normal operation without a failure in 7d or one of the two computing devices, the dataflow is as follows. The sensor/device data is received and processed by both RT/FT nodes (so that if one node fails no processing time or state is lost). Thus, if RT/FT$^1$ were to fail, RT/FT$^2$ would be in receipt of the same sensor/device data and be able to generate the output data in order for the control system 30 and the components that need real-time outputs to maintain real-time operation such as actuator A. In one embodiment, the primary node (RT/FT$^2$ in the above diagram) supplies the control output/output data to the actuator(s) A. This is an exemplary requirement. In other instances, the secondary node (RT/FT$^1$ in the above diagram) supplies the control output/output data to the actuator(s) A. In another embodiment, both the primary computing device and the secondary computing device can generate the output data and transmit the output data redundantly with the actuator operable to be able to process the duplicative signals and ignore duplicative inputs in some embodiments.

Checkpointing

Figure 4:
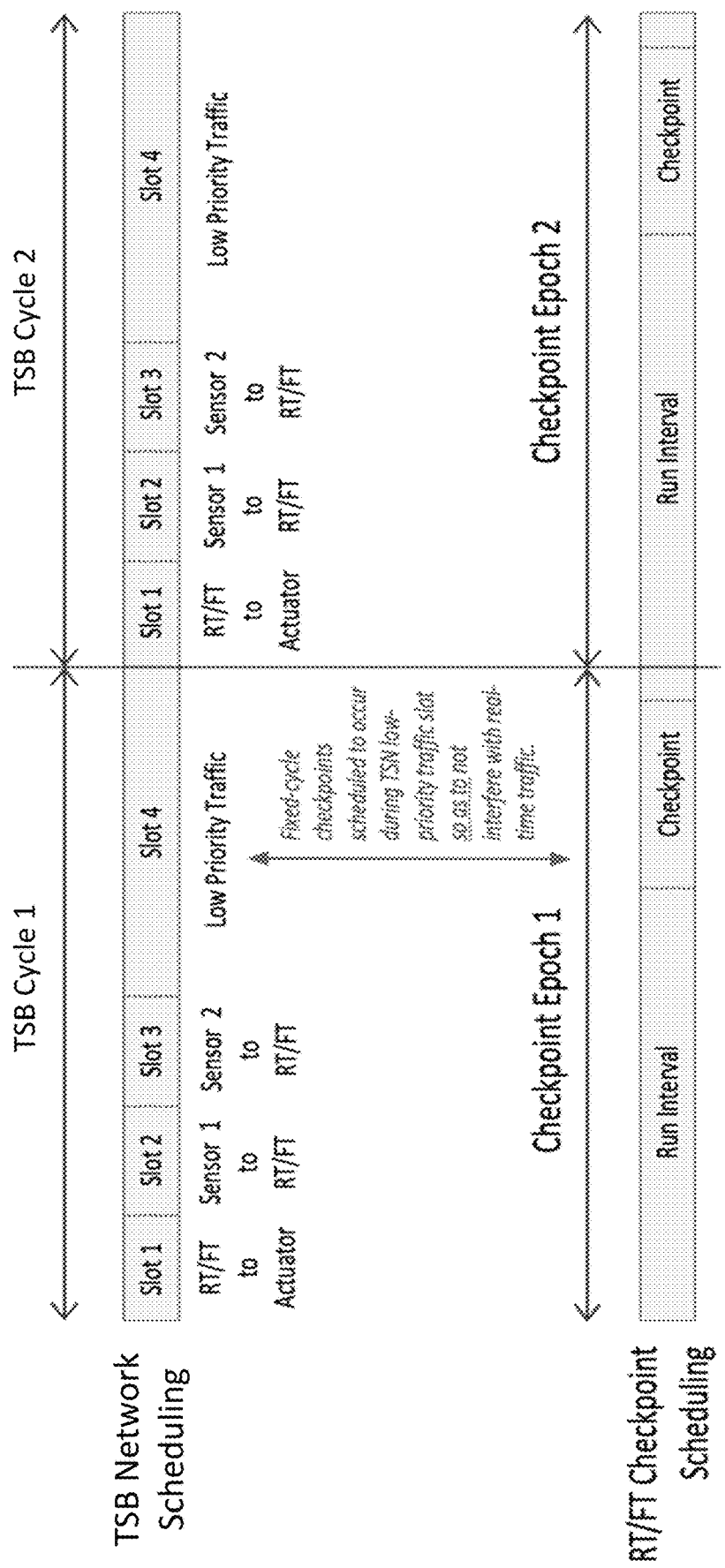
FIG. 4 is a schematic diagram showing checkpoint coordination relative to various time-slots of a shared bus for use in a real-time fault tolerant system in accordance with an embodiment of the disclosure.

In various embodiments, checkpoints are coordinated with a TSB so that checkpoints overlap or a synchronized for release only with the lower-priority (non-real-time) communication timeslots of the TSB. Coordinating and scheduling checkpoints and checkpoint data using lower priority timeslots prevents a checkpoint operation from interfering with real-time communication. For example, if checkpoint data was competing with output data needed by an actuator to maintain a rate of fluid flow in a chemical engineering plant, it could be disastrous if checkpoint data was sent using a timeslot needed to control the actuator. FIG. 4 is a schematic diagram showing various scheduling interactions relative to timeslots of an exemplary TSB and checkpointing operations. In general, FIG. 4 shows an exemplary approach to coordinating checkpoints of a RT/FT system with a TSB.

Specifically, as shown in FIG. 4, a RT/FT system is processing device data from sensors and generating output data for actuators on a per cycle basis. Two processing cycles of the RT/FT are shown TSB Cycle 1 and TSB Cycle 2. A given TSB cycle includes N time slots. In the example shown for each cycle, four time slots are shown, thus N=4. The duration of the time slots may be the same or they may be different. As shown, time slot 4 is allocated for low priority traffic and has a longer duration than time slots 1-3. Each of the respective cycles spans two parallel data generating events. These events include checkpoint scheduling and TSB network scheduling. As noted above, the time a checkpointed VM or OS is running is called the run interval and the time a checkpointed VM or OS is stopped to capture state is called the checkpoint. The sum of these two intervals is called the epoch.

A first checkpoint epoch and a second checkpoint epoch with their own respective run interval and checkpoint during which the VM or OS is stopped during time slot 4 are shown in FIG. 4. The first epoch corresponds to the TSB Cycle 1 and the second epoch correspond to TSB Cycle 2. These respective time periods may differ in some embodiments. As shown, after the run interval for a given computing device of a RT/FT, a checkpoint is released such that is overlaps with or is synchronized with a time slot, such as time slot 4 in the example shown for each epoch. Fixed-cycle checkpoints are scheduled to occur during TSB (or TSN as shown in this example) during low-priority time slot on the TSB to avoid interfering with real time traffic. Various examples of real-time traffic are shown with regard to time slots 1, 2 and 3 for each TSB cycle.

Figure 5:
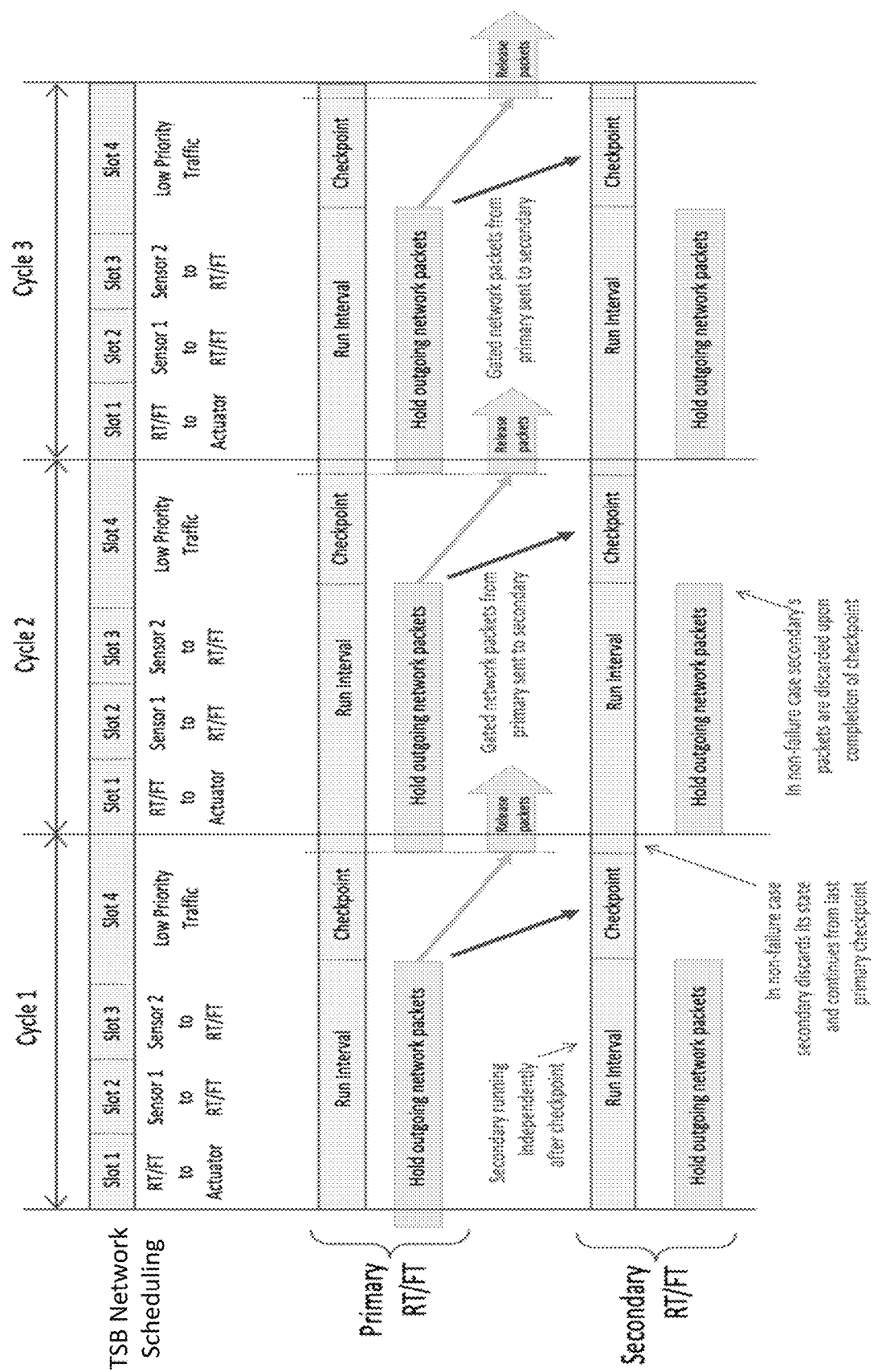
FIG. 5 is a schematic diagram showing three cycles of operation for a primary and a secondary RT/FT real-time fault tolerant implementation in which packets corresponding to output data are held of gated.

Another element of the disclosure is that both of the computing devices of the RT/FT are active. In contrast, in some fault tolerant system, one computing device is passive and needs time to effectively take over from the active computing device to which it is paired. By having both nodes active, no processing time or state is lost when/if the primary fails and hence real-time deadlines can be maintained even when the primary node fails. In addition, to support real-time fault tolerance network packets are gated until after the next checkpoint. FIG. 5 is a schematic diagram showing three cycles of operation for a primary and a secondary RT/FT real-time fault tolerant implementation in which packets corresponding to output data are held or gated. FIG. 5 offers more detail relative to the embodiment of FIG. 4 with each of the computing devices (primary RT/FT and secondary RT/FT) requiring time slot management over multiple processing cycles (cycle 1, cycle 2, and cycle 3 are shown but any number of cycles is possible). In turn, during each cycle, a run interval and a checkpoint is also occurring. Thus, in various embodiments, for N cycles, there are N epochs, absent a failure or some other event.

As shown in FIG. 5, network packets are gated or held because during the run interval the two nodes can diverge. During each of the run intervals, outgoing network packets that would be sent over the TSB are held. If a failure were to occur as part of the RT/FT and packets were being released immediately, the packets earlier released by the now failed node may not be state consistent with the packets released by the former secondary now primary node after the failure. By gating the packets, the RT/FT ensures the packets released were all generated by the node whose state is carrying forward from the previous epoch. In various embodiments, gating packets may also be referred to as delaying packets. Gated packets are released during the correct TSN time slot. If this not adhered to, a given real time system may cease to be fault tolerant and experience errors which in turn may prevent real-time operation. Outgoing packets from the previous run interval are released after a checkpoint has occurred during a low priority time slot.

The gated outgoing network packets from primary RT/FT are sent to secondary RT/FT. The secondary RT/FT generally operates to hold outgoing packets received from primary and discards those packets if the primary does not fail during the cycle the primary is releasing its copy of the corresponding packets. In a non-failure cycle, the secondary RT/FT discards its state from that cycle and continues from the last primary checkpoint. In addition, in a non-failure case, secondary RT/FT's packets are discarded upon completion of checkpoint. The above points discussed with regard to FIG. 5 may be more clearly illustrated by examining a failure case.

Figure 6:
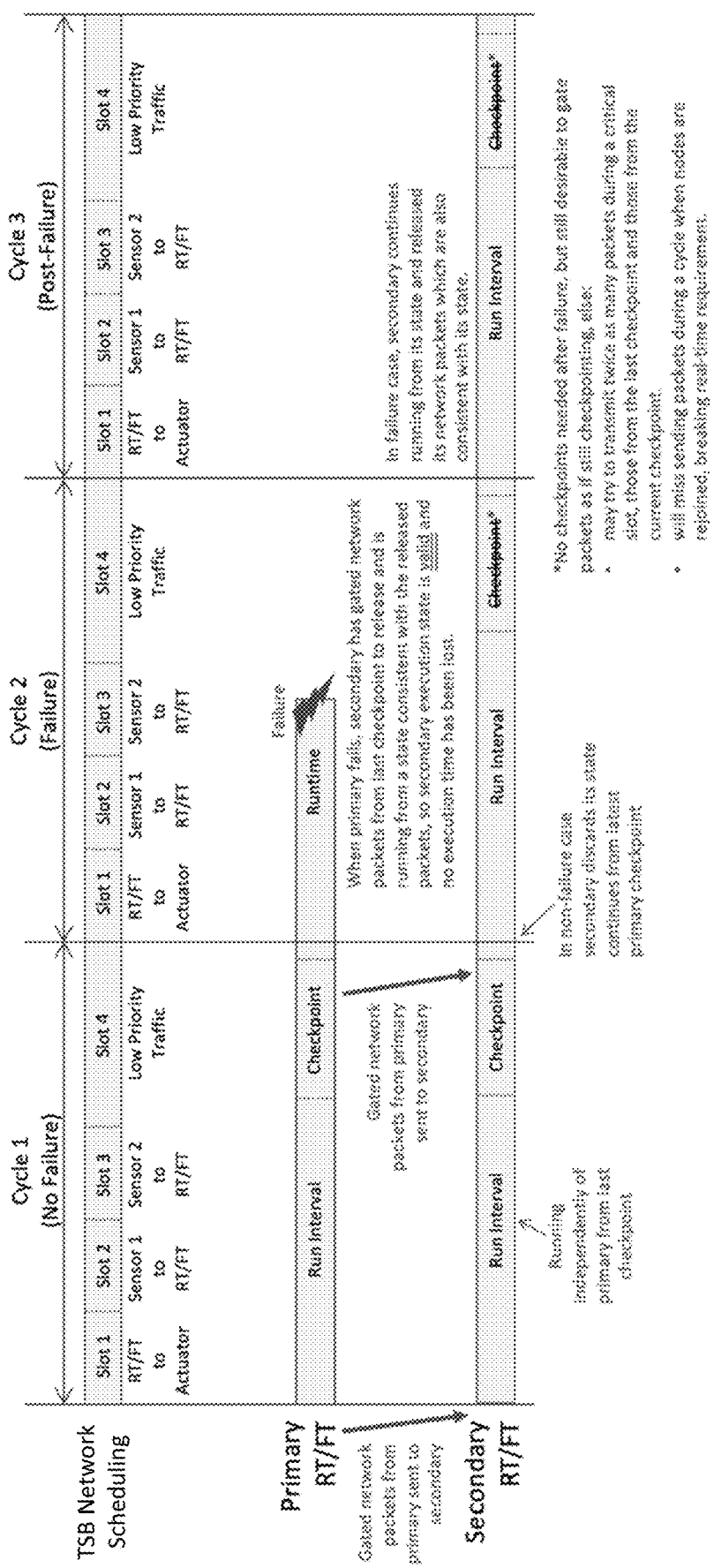
FIG. 6 is a schematic diagram showing three cycles of operation for a primary and a secondary RT/FT real-time fault tolerant implementation that shows real-time checkpointing in accordance with and embodiment of the disclosure.

FIG. 6 is a schematic diagram showing three cycles of operation for a primary and a secondary RT/FT real-time fault tolerant implementation in the case of a failure. As was the case with FIG. 5, there are three cycles divided into timeslots for scheduling device data and output data relative to the timeslots available on the TSB. In the first cycle, cycle 1, there is no failure and each of the primary RT/FT and the secondary RT/FT schedule device data and output data (for actuator) in time slots 1, 2 and 3, with low priority traffic corresponding to checkpoint handled on time slot 4.

As shown, prior to cycle 1, gated network packets from the previous cycle are sent from the primary to the secondary. During the run interval aligned with part of cycle 1, the secondary is running independently of the primary following the last checkpoint. During cycle 1, gated packets from the primary are sent to the secondary. In a non-failure case, the secondary discards its state and continues from last primary checkpoint.

As shown in FIG. 6, in cycle 2 there is a failure event at the primary RT/FT and cycle 3 shows details post-failure. When the primary fails during cycle 2, the secondary has gated network packets from the last checkpoint to release. In addition, the secondary is running based on a state that is consistent with released packets. As a result, the secondary's execution state is valid and no execution time is lost. Effectively, the secondary can pick up immediately where the primary left off with no loss of processing time. No checkpoints are needed after failure, but in some preferred embodiments, it is desirable to gate packets as if checkpointing occurred. In some non-preferred embodiments where packets are not gated as if checkpointing is still occurring, post failure the secondary may try to transmit twice as many packets during a critical (high priority) time slot from the last checkpoint and those from the current checkpoint. In other non-preferred embodiments where packets are not gated as if checkpointing is still occurring, post-failure the secondary may miss sending packets during a cycle when the primary returns to operation, which may break the real time requirement of the overall RT/FT. In cycle 3, after the failure of primary, the secondary continues running from its state and in preferred embodiment releases its network packets which are consistent with its processing state the following cycle.

Networking Features and Management of Outgoing Packets

Dropping outgoing network packets is not acceptable for true real-time operation. This follows because the time penalty for a higher-level protocol recovery would break real-time deadline commitments. Further, many real time busses assume reliable transmission for critical packets and do not have a higher-level recovery protocol. For example, TSN is at the ethernet level and with TSN reliable ethernet transmission can be achieved for critical packets since all collisions can be avoided.

Figure 7:
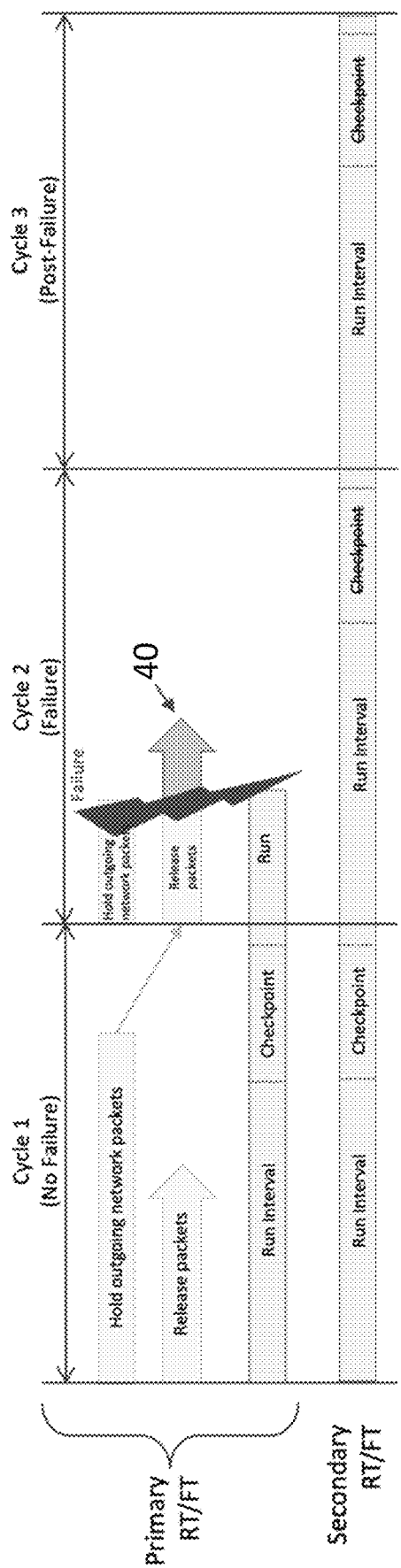
FIG. 7 is a schematic diagram showing three cycles of operation for a primary and a secondary RT/FT real-time fault tolerant implementation.

FIG. 7 is a schematic diagram showing three cycles of operation for a primary and a secondary RT/FT real-time fault tolerant implementation. As illustrated in FIG. 7 below, the real-time checkpointing solution could drop outgoing packets on failover were not the mechanisms described below incorporated into the invention. Specifically, packets from the previous cycle (labeled cycle 1) have been queued by the primary RT/RT for release in the following cycle, labeled cycle 2. If the primary RT/FT fails during cycle 2, not all packets maybe be released. As shown in FIG. 7, during failure of primary in cycle 3, packets 40 are not transmitted because active node failure before it released all of the packets from the last epoch.

In part, the disclosure also relates to removing the possibility of dropped outgoing packets on failover. This may be achieved by the primary RT/FT sending its outgoing packets to the secondary, either during the run interval or at the checkpoint. Then, depending on the system constraints, one of two algorithms or methods can be applied for ensuring no outgoing packets are dropped when failure occurs. The first algorithm operates such that if the system can tolerate large numbers of duplicate packets, both the primary and secondary RT/FT can unconditionally release the outgoing queued packets during their assigned time slots. The second algorithm provides that if the system cannot tolerate large numbers of duplicate packets, the primary can supply the secondary and ongoing indication of which packets have been released. If the primary fails, the secondary would then resume releasing packets from where the primary left off prior to failure. Generally, packets are released during their assigned time slot.

It should also be noted that for the second algorithm above, allowance is made for the fact that there can be delay in the primary's release of a packet relative to providing an indication to the secondary that the packet has been released. One solution is to delay the indication of a packet's release to the secondary a sufficient amount to ensure the packet has in fact been released by the time the notification is received by the secondary. This does create a timing window wherein duplicate packets are a possibility, specifically at failover, a packet or some packets released by the primary can be re-released by the secondary.

Incoming Packets

For real-time checkpointing, both nodes are operable to receive incoming packets since both nodes are actively running the OS and application workload. This is in contrast with active-active solutions which may operate with a primary VM receiving all incoming packets and forwarding them to the secondary so that they are received by both nodes. Such an active-active approach can result in dropped incoming packets. For example, the packets intended to be received between the time the primary fails and the network packets are being re-routed to the secondary, upon it becoming primary, will be dropped. Dropped packets are unacceptable for true real-time operation and thus an active-active implementation is not possible for a real-time implementation. Further, in various embodiments to avoid dropped incoming packets on failover, external transmitters of real-time network packets may use multicasts or broadcasts so that packets are being directly received by both nodes.

Overhead Considerations—Checkpoint Interval and Network Gating

Checkpointing introduces overhead associated with periodically stopping the OS or guest VM. There are limits to how quickly this can be done. Further, input to output latency is impacted by the need to gate outgoing packets across checkpoints. Depending on how the network time slots are assigned relative to the checkpoints, this added latency may be as short as the worst-case checkpoint interval or as long as a whole checkpoint cycle.

Fault Detection

In some embodiments, time-slot duration or period may be increased to account for fault detection time. For example, if during a timeslot, about 100 μsec worth of data can be transmitted, the time allotted to that timeslot is increased by a detection time DT. The detection time DT allows for the time it takes a secondary to detect that a primary computing device has failed and resume transmission of the outgoing data. Absent the inclusion of a detection time DT, during a failure case not all outgoing data will be able to be transmitted during the timeslot. In various embodiments, the detection time DT ranges from about 0.1 microsecond to about 100 microseconds. In various embodiments, the detection time DT ranges from about 1 microsecond to about 500 microseconds.

Virtualization-Based Checkpointing

Figure 8:
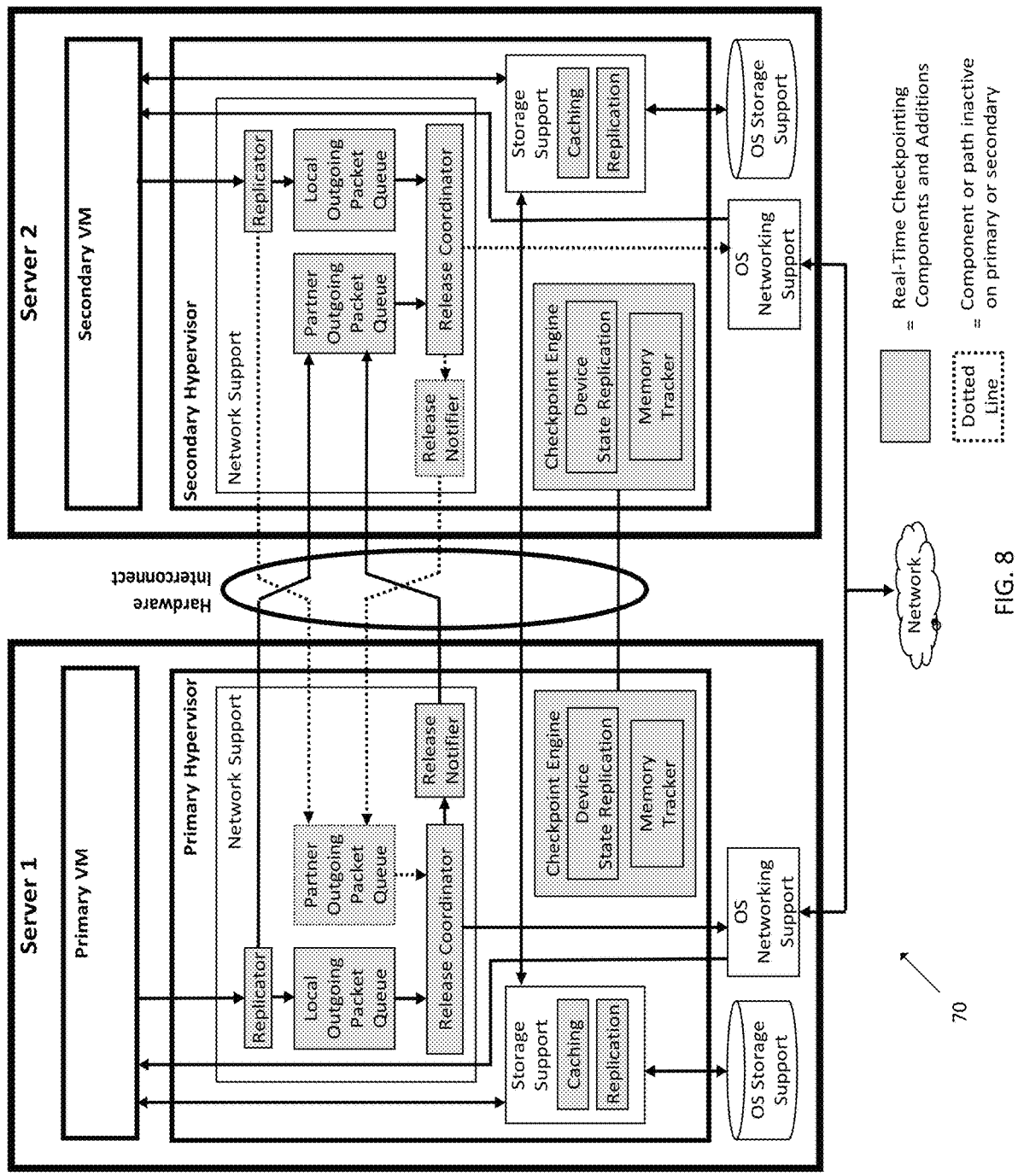
FIG. 8 is a block diagram of a real-time fault tolerant virtualization-based checkpointing system according to an embodiment of the disclosure.

FIG. 8 is a block diagram of a real-time fault tolerant virtualization-based checkpointing system according to an embodiment of the disclosure. As shown in FIG. 8, a virtualization-based real-time FT checkpointing solution is implemented in fault tolerant system 70. As shown, the real-time FT checkpointing support is implemented by modifications and additions within a hypervisor. For example, if a virtualization-based real-time checkpointing system was being implemented on Linux, it could be implemented via extensions and/or modifications to KVM/QEMU (a common Linux hypervisor). Various configurations of virtual machines (VM) may be used. Various components that support real-time checkpointing are shaded. In addition, various components or paths that are inactive are shown with a dotted line.

The system 70 includes Server 1 and Server 2. The servers may be any suitable computing devices. In one embodiment, the servers are commodity or custom servers running an OS which supports virtualization. Though the illustration shows a single hypervisor/VM on each server (a single real-time FT hypervisor/VM pair) various other configurations are possible. For example, the system 70 may include multiple hypervisor/VMs on each server and hence multiple real-time FT hypervisor/VM pairs, non-real-time hypervisor/VM pairs, and non-paired (unprotected) hypervisor/VMs. The system 70 includes a primary VM and a secondary VM associated with Server 1 and Server 2, respectively, as shown. The primary VM is in communication with the primary hypervisor. Similarly, the secondary VM is in communication with the secondary hypervisor. In general, the components of server 1 are mirrored in server 2 in terms of the functional blocks and software components shown relative to the hypervisor, checkpoint engine, storage support and network support features shown. In various embodiments, all of the foregoing are implemented using combinations of software modules and software programs.

Server 1 and Server 2 are connected or linked by a hardware interconnect. In one embodiment, the hardware interconnect is a physical medium such as a hardware bus or bridge through which checkpointing state is transferred between the two physical servers. The hardware interconnect can be a network connection, a non-transparent PCI bridge, or any other high-performance computer interconnect. In various embodiments, a checkpoint is transferred using the hardware interconnect during the occurrence of a low priority time slot being the active time slot on the TSB. In one embodiment, checkpoint data may be transferred on the hardware interconnect during all time slots (though transmission of the final state on the hardware interconnect does occur during the low priority time slot.) The "final stage" of a checkpoint is the most processor/system intensive operation and that other stages of the checkpoint do not impact real-time functionality. In various embodiments, one or more stages of a checkpoint, such as the final stage has a performance impact because the customer application or VM is not running at that time. As a result, the goal is to transfer the checkpoint data as quickly as possible which has associated performance costs.

As noted herein, such performance costs may negatively impact real-time performance. The connection of the hardware interconnect to various components of each computing device can vary depending on the type of hardware interconnect that is in use. For example, if the interconnect is a non-transparent PCI bridge, it does not go through the network such as is shown at the bottom of FIG. 8. If the hardware interconnect is implemented using a network connection, it does connect to the network shown at the bottom of FIG. 8 and may connect from networking interfaces associated with the OS Networking Support. Selectively transferring checkpoint data that negatively impacts real-time performance during low priority transfers on the TSB avoids additional strain on a given server, which facilitates real-time performance.

Each of server 1 and server 2 include a checkpoint engine. The checkpoint engine and all of the components depicted within the hypervisor for each of server 1 and server 2 are additions to or modifications of each respective hypervisor. The checkpoint engine initiates periodic checkpoints as determined by the TSB timing. The purpose of the checkpoint process is to update the state of the secondary VM to match the state of the primary VM, so that if the hardware running the primary VM were to fail the secondary node can take over without an application outage.

The steps of the checkpoint process include one or more of the following:

Stopping OS execution on both the primary and secondary VMs.

Notifying the storage and network components that a checkpoint is starting.

Obtaining lists of VM memory modified since the last checkpoint by both the primary and secondary VMs. Calculate the union of these two lists.

Using the union of modified memory list, send the modified VM memory from the primary to secondary hypervisors, via the Hardware Interface.

On the primary VM, capturing the state of the VM processors and devices. Send the processor and device state from the primary to secondary hypervisor via the Hardware Interface.

On both the primary and secondary hypervisors informing the Network Support and Storage Support components that the checkpoint process has completed, and that the VM is about to resume.

Resuming VM execution on both the primary and secondary nodes.

It is important that the system and time slots be properly sized to support real-time checkpointing. Timeslots may be sized according to the application for which the real-time fault tolerant system is being used as well as the cycle time specified by a user. During the checkpoint process, if either the primary or secondary checkpoint engine detects that the checkpoint duration will exceed the time allotted and hence possibly interfere with real-time deadline commitments, the checkpoint will be aborted, and the system reverted to a simplex state to ensure real-time deadlines are met. Reverted to simplex state refers to when the secondary and primary stop checkpointing and the primary runs alone (and unprotected since it is no longer checkpointing). If this occurs, one server will re-partner to the other server to restore FT operation. Similarly, if either the primary or secondary checkpoint engine detects the need to perform a checkpoint at other than the timeslot specified by the TSB timing, the system will revert to a simplex state to ensure real-time deadlines are met. If this occurs, the system will re-partner itself to restore FT operation. Examples of items that can cause an unscheduled checkpoint are: an improperly sized system where buffers associated with memory tracking being too small to record all the memory changes that occur between checkpoints or storage caches too small to cache all the storage changes between checkpoints.

Within the checkpoint engine are two subcomponents, a Memory Tracker and a Misc Device State Replication component. The memory tracker utilizes processor hardware features to track memory modified by the VM so the checkpointing engine knows what memory needs to be copied at a checkpoint. In turn, the Misc Device State Replication component captures VM device state in the primary hypervisor and applies to the VM in the secondary hypervisor as part of a checkpoint.

The checkpoint engine in the secondary hypervisor of server 2 waits for the complete checkpoint data to be received, including the dirty page data and the Miscellaneous Device State data, and then applies that data and resumes VM operation in the context of the new checkpoint.

Storage Support Components

The storage support components interface with the hypervisor storage functionality in order to support checkpointing. The specific checkpointing related components are a caching component and a replication component. The caching component caches storage writes occurring between each checkpoint from both primary and secondary VMs. The primary and secondary VMs are non-deterministic when running. As a result, these VMS might not be writing the same data to storage. For example, if VMs are processing transactions in a different order because of non-determinism, the time stamps for the transactions written to storage on the primary could be different than the timestamps written to storage on the secondary. This storage interaction may be referenced as a view of the storage. The views are in the cache until the checkpoint, after which (in the non-failure case) the primary's data/view is written to disk and the secondary's data/view is discarded. Within a run interval, the VMs' view of storage is allowed to diverge between the VMs, as each VM operates independently and potentially issues different write requests. Following each checkpoint, the secondary VM's storage is made identical to the primary VM's storage. Caching writes instead of providing them to the OS to be committed to media provides certain advantages. For example, one advantage is that the secondary cache can simply be discarded following a checkpoint. It would also be problematic to commit primary writes to the media before taking a checkpoint, in case of primary node failure and eventual recovery from the secondary; in that case the primary cache would likewise be discarded.

In addition, a replication component is also used to support various storage functionality. A storage component supports replicating storage between primary and secondary VMs. At the start of each run interval, VM storage is identical. This requires an initial full synchronization operation before operation begins. Then, working in conjunction with the caching component of the storage support component, storage modifications are replicated from primary to secondary hypervisors as each checkpoint is taken, and committed to the secondary storage media via the OS. Each of the storage components may be implemented as one or more software programs, methods or routines.

Network Support Components

The network support components interface with the hypervisor network functionality in order to support checkpointing and real-time operation. These components include a replicator, a local outgoing packet queue, a release coordinator, a partner outgoing packet queue and a release notifier. Each of these may be implemented as one or more software programs, methods or routines.

In the primary hypervisor, the replicator is operable to take outgoing network packets from the primary VM and sends the packet to the primary's local outgoing packet queue and the secondary's partner outgoing packet queue. In the secondary hypervisor, the replicator is inactive and serves simply as a pass-thru for packets from the secondary guest to the secondary's local outgoing packet queue. Along with the packets, the replicator passes information identifying which TSB time slot to which each packet is assigned. The local outgoing packet queue is operable to queue packets from the local VM instance for possible later release by the release coordinator. Along with the packets, information identifying which TSB time-slot each packet is assigned to is queued. The partner outgoing packet queue component is operable to queue packets from the partner VM instance for possible later release by the release coordinator. It is only active on the secondary hypervisor.

Two alternatives for releasing outgoing packets are discussed above. These include as follows:
 a) If the system can tolerate large numbers of duplicate packets, both the primary and secondary RT/FT can unconditionally release the queued outgoing packets.
 b) If the system cannot tolerate large numbers of duplicate packets, only the primary releases the queued outgoing packets in the non-failure case.

If alternative b is in use, the partner out going packet queue (only active on the secondary) is receiving notifications from the primary release notifier when packet(s) are released from the primary. The corresponding packet(s) are then removed from the partner outgoing packet queue.

The release coordinator is operable to release packets from the appropriate queue at the appropriate time to the OS and hence to the external network. In all cases, a packet is released during its assigned TSN time slot.

In non-failure cases, packets from the previous epoch are released from either:
 a) both the primary hypervisor's local outgoing packet queue and the secondary hypervisor's partner outgoing packet queue if alternative a from above is in use; or
 b) just the primary hypervisor's local outgoing packet queue if alternative b above is in use If alternative b from above is in use, the primary's release coordinator notifies the primary's release notifier of each packet released. After a delay to ensure the packet has in fact been released, the release notifier passes the notification onto secondary's partner out going packet queue. If alternative b from above is in use and the primary hypervisor or VM fails, the secondary release coordinator releases the remaining packets in the secondary's partner outgoing packet queue.

The release notifier is only used in option b above and is operable to notify the secondary of any packets released by the primary. The main function of the release notifier is to add sufficient delay to notification to the secondary to ensure the packet has in fact been released by the primary. This is to avoid any dropped packets after a failover due to the former secondary thinking a packet has been released when it has not.

OS-Based Checkpointing

Figure 9:
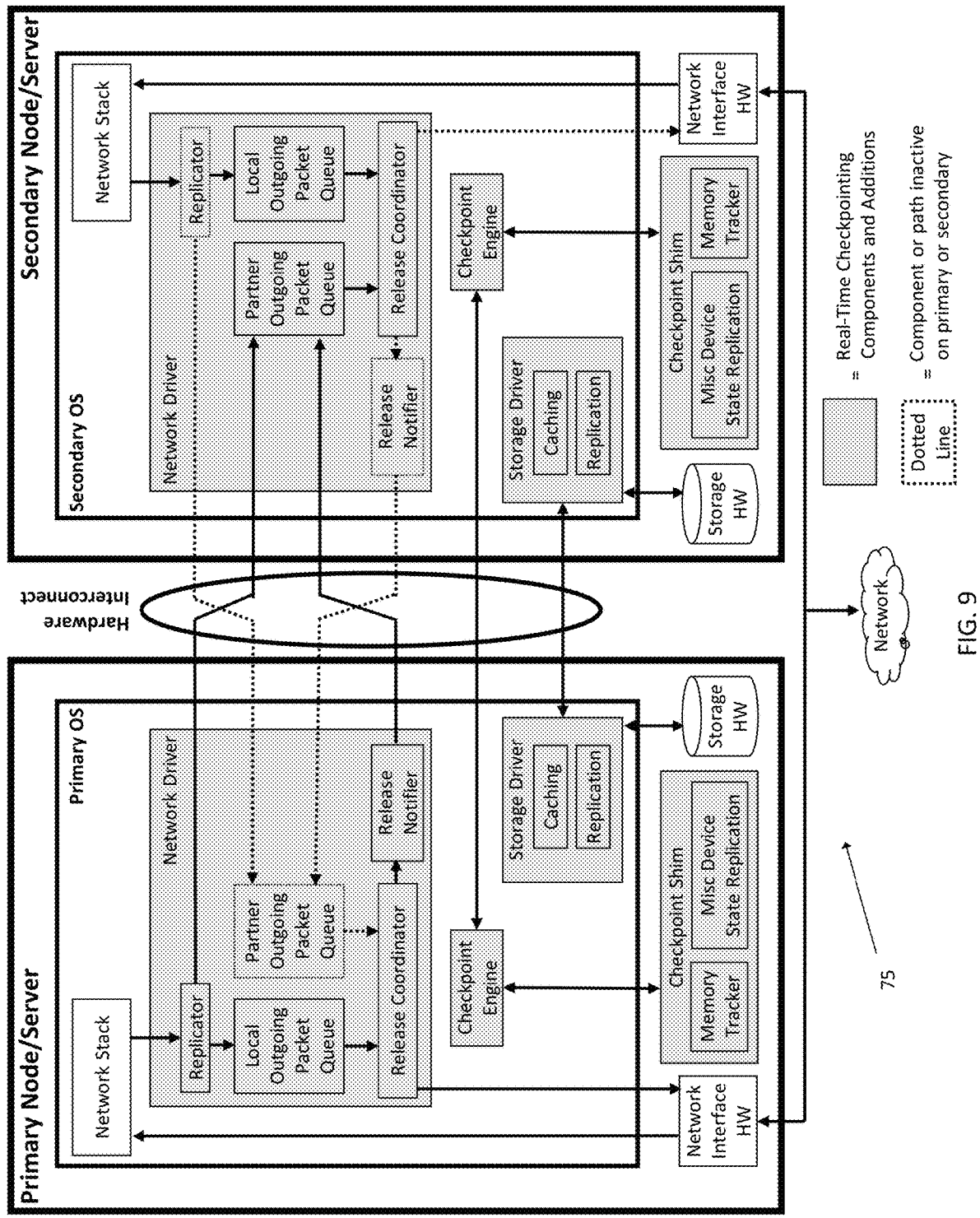
FIG. 9 is a block diagram of a real-time fault tolerant operating system-based checkpointing system according to an embodiment of the disclosure.

FIG. 9 is a block diagram of an OS-based for implementing real-time fault tolerance. OS-based checkpointing is described, which supports real-time operation using various components as depicted and discussed with regard to FIG. 9. A primary node/primary server running a primary OS is connected by a hardware interconnect to a secondary node/secondary server running a secondary OS. As shown, OS-based real-time FT checkpointing support is implemented by modifications and additions within or below the operating system. For example, a Linux OS-Based checkpointing solution would be largely implemented in a Linux storage driver, a Linux network driver, and a Linux checkpoint driver. The system 75 of FIG. 9 compares to the earlier discussed virtualization-based real-time FT checkpointing of FIG. 8 wherein support is implemented via hypervisor additions or modification. Various components that support real-time checkpointing are shaded. In addition, various components or paths that are inactive are shown with a dotted line.

Conceptually, many of the components in FIG. 9 perform the same function of the similarly named components in FIG. 8. There are differences that arise from a virtualized approach versus an operating system based-approach. Because OS-based checkpointing synchronizes systems at the machine level (vs the VM level), there are more stringent constraints on the actual hardware for OS-based RT/FT. The Primary Node/Server and Secondary Node/Server are commodity or custom servers that satisfy one or more of the following requirements:
 The servers are configured with an identical hardware configuration
 The servers contain hardware supported by the checkpointing network driver, the checkpointing storage driver, and the checkpoint shim for the target OS.

Also, unlike virtualization-based checkpointing, wherein multiple VMs can be checkpointed and both physical servers can hence simultaneously host primary VMs and secondary VMs, OS-based checkpointing has a primary server and a secondary server.

The server OS is protected by and contains the checkpointing technology. This server OS can be a standard OS (Windows, Linux, and/or VMware) but various OS specific driver additions and modifications are needed to support the checkpointing functionality.

In one embodiment, the hardware interconnect is a physical medium such as a hardware bus or bridge through which checkpointing state is transferred between the two physical servers. The hardware interconnect can be a network connection, a non-transparent PCI bridge, or any other high-performance computer interconnect. In various embodiments, the hardware interconnect is separate from the TSB and does not connect thereto. Software support for the hardware interconnect is within the checkpoint engine driver. Native OS support for the hardware interface cannot be used because the checkpointing operations need to be independent of the checkpointing OS (for example, checkpoint activity needs to continue even if the host OS is generally paused for a checkpoint). This means for example, that if TCP/IP is used over a NIC to transfer the checkpoint driver, a TCP/IP stack distinct from the host OSs TCP/IP stack is implemented in the checkpoint driver.

Referring to FIG. 9, the checkpoint engine initiates periodic checkpoints as determined by the TSB timing. The purpose of the checkpoint process is to update the state of the secondary node to match the state of the primary node, so that if the primary node were to fail, the secondary node can take over without an application outage.

The steps of the checkpoint process are:
 Informing Network and Storage drivers that a checkpoint is imminent. The checkpoint pauses here until storage driver performs callback indicating outstanding storage accesses have been completed.
 Stopping OS execution on both the primary and secondary nodes.
 Obtaining lists of memory modified since the last checkpoint on both the primary and secondary nodes. Calculate the union of these two lists.
 Using the union of modified memory list, send the modified memory from the primary to secondary nodes, via the Hardware Interface.
 On the primary node, capturing the state of the processors and devices.
 Sending the processor and device state from the primary to secondary nodes via the Hardware Interface.
 On both the primary and secondary nodes informing the Network and Storage drivers that the checkpoint process has completed, and that the OS is about to resume.
 Resuming OS execution on both the primary and secondary nodes.

In various implementations of OS-based RT/FT, the system and time slots should be properly sized to support real-time checkpointing. During the checkpoint process, if either the primary or secondary checkpoint driver detects that the checkpoint duration will exceed the time allotted on the TSB for low priority communication (and hence possibly interfere with real-time deadline commitments), the checkpoint will be aborted and the system reverted to a simplex state to ensure real-time deadlines are met. If this occurs, the system will re-partner itself to restore FT operation.

Similarly, if either the primary or secondary checkpoint driver detects the need to perform a checkpoint at other than the timeslot specified by the TSB timing, the system will revert to a simplex state to ensure real-time deadlines are met. If this occurs, the system will re-partner itself to restore FT operation. Examples of items that can cause an unscheduled checkpoint are buffers associated with memory tracking being too small to record all the memory changes that occur between checkpoints, and storage caches too small to cache all the storage changes between checkpoints.

The Checkpoint Shim is transparent to the OS and is a container for the Memory Tracker and Misc Device State Replication. This checkpoint shim component tracks memory modified by server OS so the checkpointing engine knows what memory needs to be copied at a checkpoint. In one embodiment the checkpoint shim utilizes Intel's PML (Page Modification Logging) hardware feature to track memory. In various embodiments, other hardware specific features such as motherboard or processors or other chipset specific instructions and features may be used to track memory. VT-x hardware virtualization extensions are enabled when using PML under certain scenarios. If VT-x is enabled, hardware reserves a contiguous area of physical memory for virtual machine monitor (VMM) code to operate. In a typical virtual machine environment VMM code is invoked when a virtualized guest operating system executes an instruction that needs special handling, such as interrupts, memory faults, IO access, certain privileged instructions, and indications that the PML generated list that includes modified memory locations needs to be serviced.

The Memory Tracker installs a micro-VMM shim (a minimal hypervisor) having a main function of handling PML FULL vmexit events and maintain dirty-page buffers in a reserved memory region. The VMM also processes a number of other vmexit events from the OS, mainly those vmexits which cannot be disabled in hardware while using PML. These vmexit events are emulated within the micro-VMM so that the server will continue to operate in its normal configuration while the VMM is present.

When the system workload has generated enough dirtied pages to fill up the hardware PML log, a PML FULL vmexit will occur, the new set of pages will be tracked, and workload processing will continue. This enables the Memory Tracker to generate a list of physical memory pages which have been modified on each Server since the previous checkpoint. The memory tracking embodiment tracks memory modifications at the page level; other embodiments may track memory at a different granularity.

Misc Device State Replication is a checkpoint shim component. Specifically, this checkpoint shim component captures device state not captured by OS resident components from one node/server and applies it to the other node/server as part of a checkpoint.

The checkpoint engine on the primary server issues a request to the VMM, to read or extract some device and processor state, such as timestamp counters, processor registers, stack, and other data, and to record that Misc Device State data in a reserved memory region. This data is transferred to the secondary server.

The checkpoint engine on the secondary side requests the VMM to wait for the complete checkpoint data to be received, including the dirty page data and the Miscellaneous Device State data, and then the VMM applies that data and resumes to the OS in the context of the new checkpoint.

Storage Driver and Sub-Components

The storage driver is an OS storage hardware driver designed to support checkpointing. Specific components in the support of checkpointing are a caching component and a replication component, described immediately below.

The caching components of the OS storage driver caches storage writes occurring between each checkpoint, on both primary and secondary nodes. Within a checkpoint run interval, the OS's view of storage is allowed to diverge between the nodes, as each node operates independently and potentially issues different write requests. Following each checkpoint, the secondary storage is made identical to the primary. Caching writes instead of committing them to the media provides various advantages. For example, the secondary cache can simply be discarded following a checkpoint. It would also be problematic to commit primary writes to the media before taking a checkpoint, in case of primary node failure and eventual recovery from the secondary; in that case the primary cache would likewise be discarded.

The replication component of the OS storage driver supports replicating storage between primary and secondary nodes. At the start of each run interval, storage is identical. This requires an initial full synchronization operation before operation begins. Then, working in conjunction with the caching component of the driver, storage modifications are replicated from primary to secondary nodes as each checkpoint is taken, and committed to the secondary storage media.

Network Driver and Sub-Components

The network driver is an OS network hardware driver designed to support real-time FT checkpointing. The network driver's components include a replicator, a local outgoing packet queue, a release coordinator, a partner outgoing packet queue, and a release notifier. Each of these may be implemented as one or more software programs, methods or routines.

On the primary node the replicator component takes outgoing network packets from the OSs network stack and sends the packet to the primary's local outgoing packet queue and the secondary's partner outgoing packet queue. On the secondary node, the replicator component is inactive and serves simply as a pass-thru for packets from the secondary OSs network stack to the secondary's local outgoing packet queue. Along with the packets, the replicator passes information identifying which TSB time slot each packet is assigned to.

The local outgoing packet queue component queues packets from the local OS network stack for possible later release by the release coordinator. Along with the packets, information identifying which TSB time-slot each packet is assigned to is queued. The partner outgoing packet queue component queues packets from the partner OS network stack for possible later release by the release coordinator. It is only active on the secondary node.

Two alternatives for releasing outgoing packets are discussed above. These also apply to the OS-based RT/FT systems. These include as follows:
  a) If the system can tolerate large numbers of duplicate packets, both the primary and secondary RT/FT can unconditionally release the queued outgoing packets.

b) If the system cannot tolerate large numbers of duplicate packets, only the primary releases the queued outgoing packets in the non-failure case.

If alternative b is in use, the partner out going packet queue (only active on the secondary) is receiving notifications from the primary release notifier when packet(s) are released from the primary. The corresponding packet(s) are then removed from the partner outgoing packet queue.

The release coordinator releases packets from the appropriate queue at the appropriate time to the OS and hence to the external network. In all cases, a packet is released only during its assigned TSB time slot.

In non-failure cases, packets from the previous epoch are released from either both the primary node's local outgoing packet queue and the secondary node's partner outgoing packet queue, if alternative a from above is in use just the primary hypervisor's local outgoing packet queue if alternative b above is in use If alternative b from above is in use, the primary's release coordinator notifies the primary's release notifier of each packet released. After a delay to ensure the packet has in fact been released, the release notifier passes the notification onto secondary's partner out going packet queue.

If alternative b from above is in use and the primary hypervisor or VM fails, the secondary Release Coordinator releases the remaining packets in the secondary's partner outgoing packet queue.

The release notifier is only used in option b above and notifies the secondary of any packets released by the primary. The main function of the release notifier is to add sufficient delay to notification to the secondary to ensure the packet has in fact been released by the primary. This is to avoid any dropped packets after a failover due to the former secondary thinking a packet has been released when it has not.

Variations and Alternative Embodiments

Standard active-active checkpointing (e.g. COLO) has two performance advantages relative to the real-time checkpointing described in the previous sections:
  Network packets are not gated, thereby significantly reducing network latency and thereby improving performance
  Checkpoints are generally only called if there is a sufficient divergence in an outgoing packet produced by both nodes, reducing the number of checkpoints for most workloads.

Figure 10:
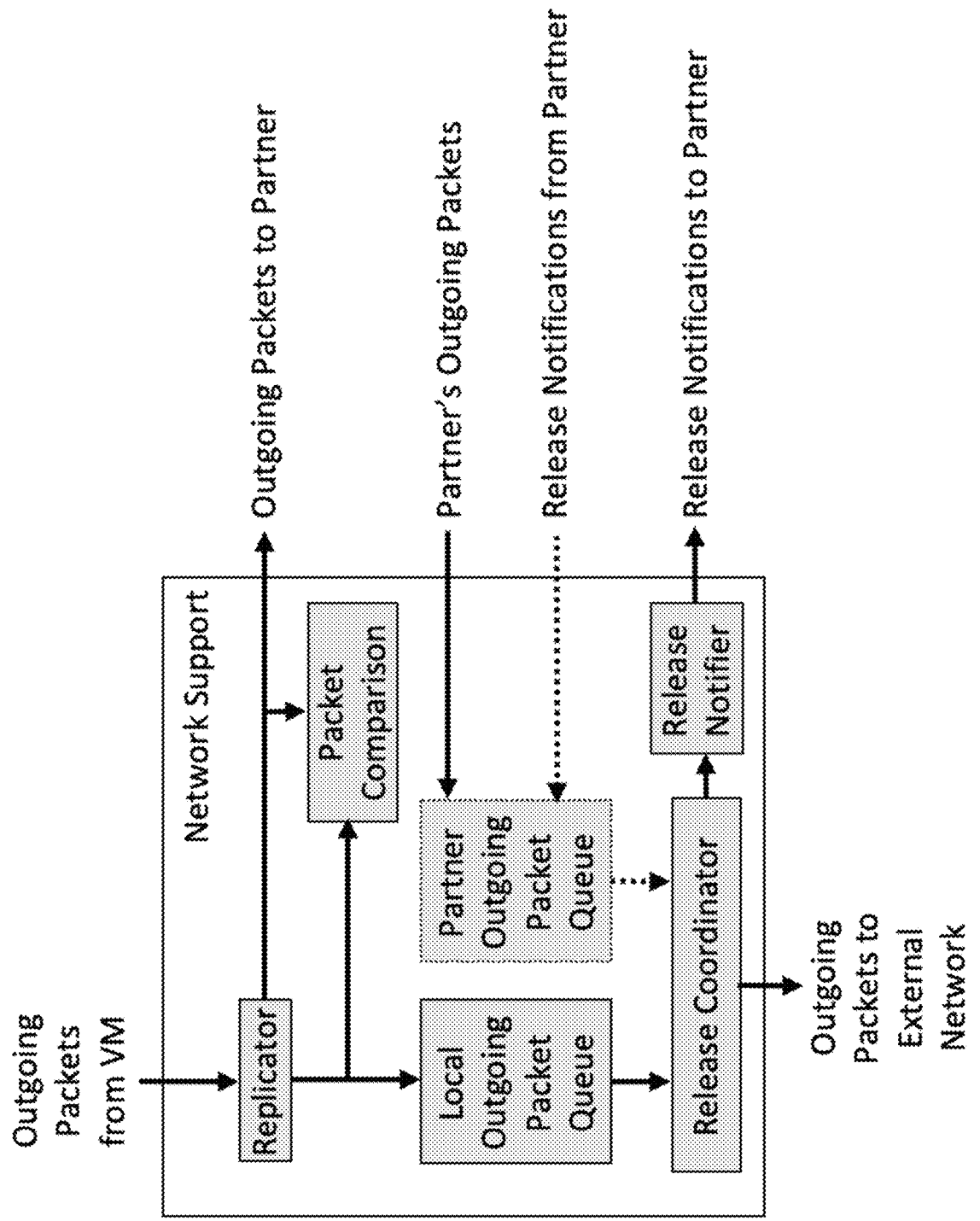
FIG. 10 is a block diagram of various networking components suitable for use in a virtualization-based real-time fault tolerant system in accordance with an embodiment of the disclosure.
Figure 11:
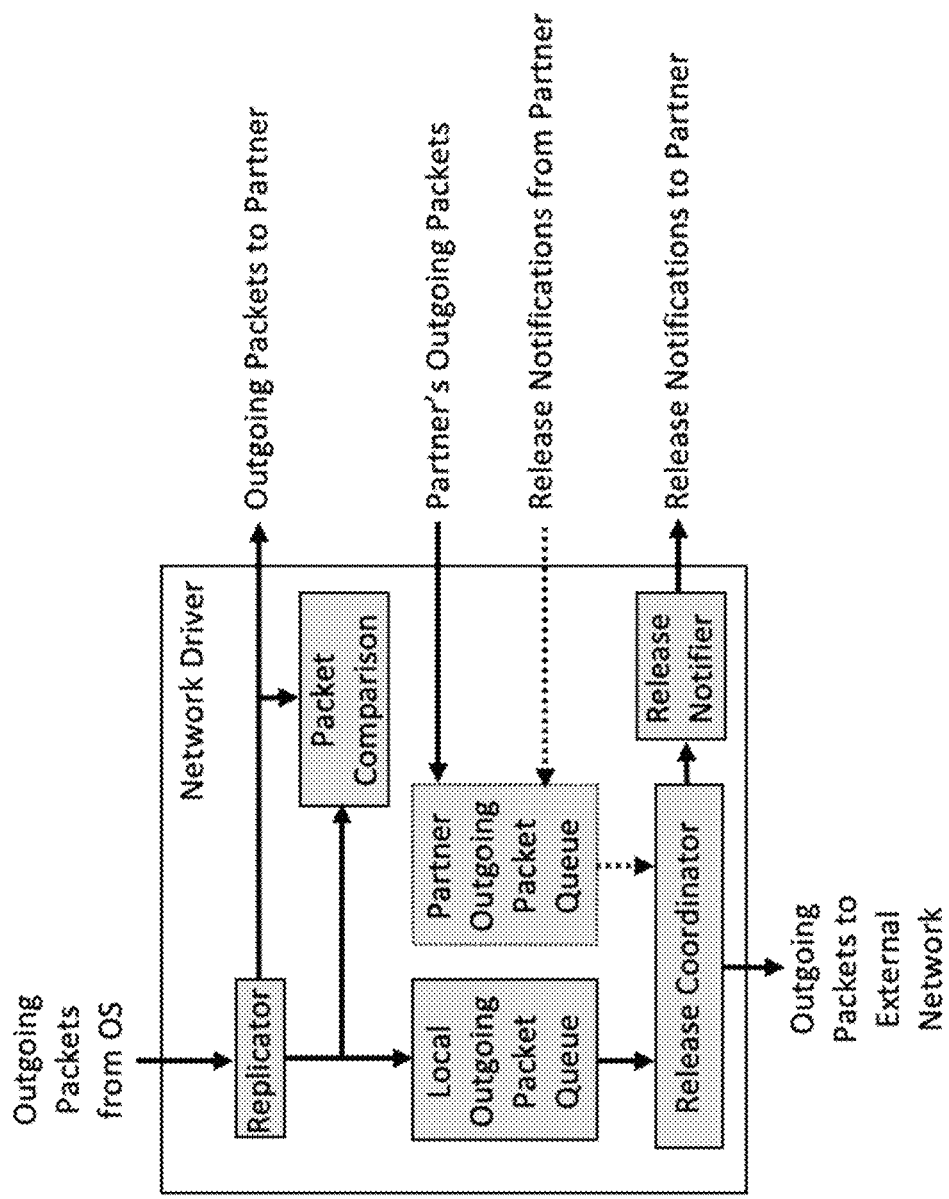
FIG. 11 is a block diagram of various networking components suitable for use in an OS-based real-time fault tolerant system in accordance with an embodiment of the disclosure.

It is not possible to implement a real-time fault tolerant solution using active-active checkpointing because the two nodes (OS-based checkpointing) or 2 VMs (virtualization-based checkpointing) may produce a sufficiently divergent packet at any time and hence require a checkpoint at any time, thereby causing a real-time deadline to be missed. Notwithstanding the foregoing, it is possible to relax the two performance advantage noted above at the cost of some tradeoffs, creating three additional real-time FT checkpointing alternatives. These three alternatives or variants include the following embodiments:
1) Variant 1—reduce checkpoints
  Skip checkpoints if not needed
2) Variant 2—reduce network gating
  Do not gate packets unless there is a miscompare
3) Variant 3 (variants 1 and 2 combined)
  Do not gate packets unless there is a miscompare
  Skip checkpoints if not needed The three variants listed above require the addition of logic to compare outgoing packets between the primary and secondary nodes. Specifically, for virtualization-based real-time checkpointing shown in FIG. 10 logic to compare outgoing packets from the secondary node to those from the primary node is added to Network Support component. Specifically, packet comparison logic is added. This packet comparison logic only needs to be active on one node though both nodes need to know the result of the comparison. Similarly, FIG. 11 shows a diagram of the OS-based real-time checkpointing network driver with the addition of packet comparison logic added. In general, references to partner refers to the other computing device or virtual machine/hypervisor as applicable.

Variant 1—Reduce Checkpoints

If outgoing packets produced by both the primary and secondary are effectively equivalent during a cycle there is no need to perform a checkpoint. This has the advantage that compute cycles and run time that would otherwise be spent on the checkpoint are available for the application. It does have disadvantages that include one or more of the following:
  1) Logic is added to the design to compare outgoing packets from the primary and secondary.
  2) When a checkpoint is needed, it will be on average longer than if a checkpoint was taken every cycle. The minimum designed possible cycle time therefore is increased to allow for these longer checkpoints.
  3) Due to reasons outlined immediately below, packets are gated for up to a little over two cycles if a miscompare occurs too late in a cycle to call a checkpoint. As described later, this breaks the regular cyclic behavior of the base implementation and can also further increase the minimum cycle time.

Figure 12A:
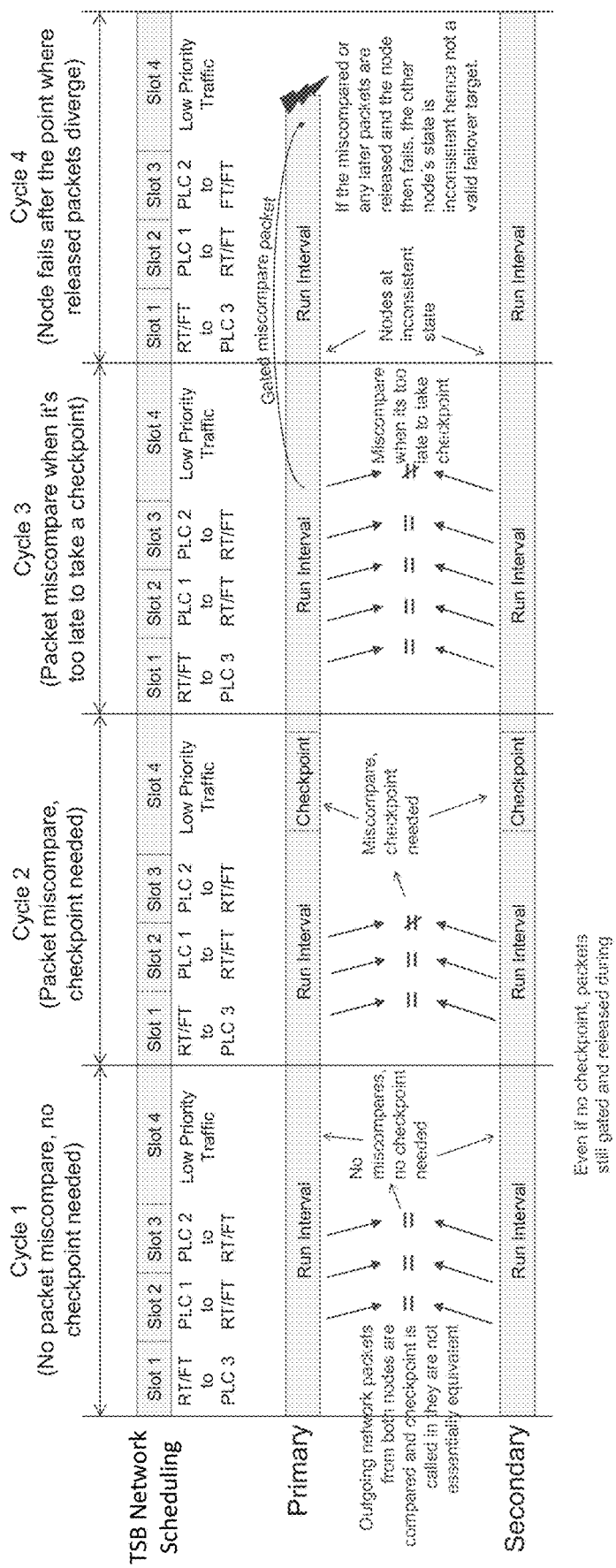
FIGS. 12A and 12B are schematic diagrams showing four cycles of operation for a primary and a secondary RT/FT real-time fault tolerant computing device implementation in accordance with an embodiment of the disclosure.

FIG. 12A illustrates the need for the packet gating if a miscompare occurs too late in a cycle to call a checkpoint. As shown in cycle 3 of FIG. 12B, if packets between the primary and secondary miscompare when it's too late to call a checkpoint the two nodes enter the next cycle in an inconsistent state. As a result, inconsistent state is released to the outside world if the secondary has to take over for the primary (due to a failure of the primary) in the following cycle.

One solution to this problem is to start gating packets once the miscompare occurs, take a checkpoint the following cycle, and continue to gate the packets until after the checkpoint. This prevents any detectable inconsistent state from being transmitted to the outside world thereby ensuring the secondary is in a sufficiently consistent state to take over for the primary. If the primary fails, it's the secondary's packets which are released. This adds at least two cycles of latency to the packets, one cycle for the delay just mentioned, and another cycle because this variant, like the base solution, always adds a cycle of delay. This will cause a cycle with no packets transmitted and a subsequent cycle with two cycles worth of packets being transmitted. This breaks cyclic behavior and could impact the minimum possible cycle time if transmitting twice the number of packets in a cycle is on the critical timing path.

While Variant 1 provides additional compute cycles, the additional compute cycles are discretionary compute cycles. The system is sized so that it can accomplish the minimum required work assuming a checkpoint in every cycle. In practice though, assuming relatively short cycle times, the vast majority of cycles should not require a checkpoint.

Variant 2—Reduce Network Gating

Figure 12B:
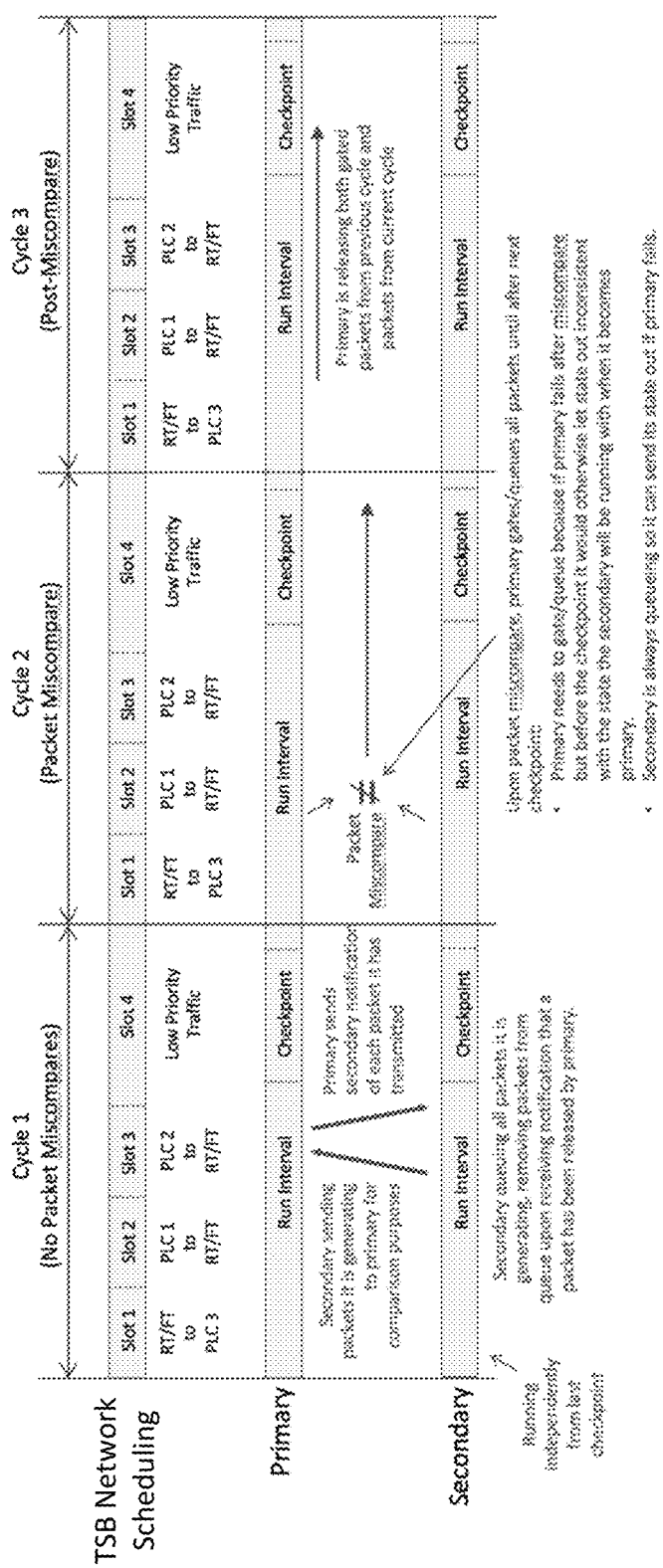

In one embodiment, a real-time checkpointing solution gates all outgoing packets every run interval. This can be relaxed to only start gating packets once a miscompare occurs. This has the advantage of reducing average network latency. In various embodiments, as part of the implementation of this variant, logic, such as hardware or software modules is added to the applicable systems and methods to compare outgoing packets from the primary and secondary. Network traffic is no longer strictly cyclic as illustrated in FIG. 12B. Specifically, referring to FIG. 12B, no packets will be delivered during time slot 3 in cycle 2, whereas in timeslot 3 of cycle 3, packets from both cycles 2 and 3 will be released. If network bandwidth was critical path in determining minimum cycle time, then the cycle time is increased because two cycles worth of packets may have to be released in a single time slot.

It should also be noted that it is only average network latency which is reduced, worst case latency remains the same or is worse. This occurs because the very first packet may miscompare and cycle times are possibly longer due to network bandwidth being a critical path in determining minimum cycle time.

Variant 3—Reduce Network Gating and Checkpoints

Variants 1 and 2 may be combined to produce a solution with lower average network latency and more discretionary compute cycles, though it is subject to the disadvantages of variant 1 and 2 outlined above.

Improvements of Real-time Fault Tolerant System Relative to Legacy Checkpointing The real-time fault tolerant systems and methods discussed above improve upon and avoid features of various legacy checkpointing approaches. Active-passive checkpointing solutions have an active VM or OS running the target workload, and a passive (standby) VM or OS which is effectively idle and is receiving periodic snapshots of the active VM or OS's state in order to pick up running the target workload should the prior active VM or OS fail.

Active-passive checkpointing solutions synchronize VM or OS state at high frequencies, buffering (gating) the output network packets during each epoch until checkpoint completes (state capture and transfer) to ensure external clients are supplied functionally consistent network packets across a failover. Further, active-active checkpointing improves performance relative to active-passive checkpointing for most workloads by relaxing the frequency of checkpoints based on output similarity and by removing the need to gate the output network packets during each epoch.

In active-active checkpointing systems, both VM and/or OS instances are running, outgoing network packets are compared between the instances and immediately released if they are sufficiently similar. The redundant VMs or OSs may diverge as long as they generate effectively identical responses to client requests. If corresponding outgoing network packets are no longer effectively identical, a checkpoint is called to re-synchronize the VMs or OSs.

Active-passive checkpointing is not suitable for real-time operation for multiple reasons. Similarly, active-active checkpointing is not suitable for real-time operation for multiple reasons. Several of these reason are discussed below and provide evidence as to why legacy active-passive and active-active checkpointing differ from various RT/FT embodiments of the presence disclosure because such RT/FT embodiments avoid one, or more or all of the following modes of operation.

In an active-passive system, checkpoint timing is independent of TSB timing and can cause real-time deadlines to be missed. If a failure occurs, the system reverts back to the last checkpoint, i.e. up to an epoch of processing time is lost, possibly causing a real-time deadline to be missed. In addition, active-passive checkpointing can drop outgoing packets upon a failure. This breaks real-time commitments and hence is not acceptable for most real-time applications. Non-real-time solutions rely on higher-level network protocols (e.g. TCP) to compensate for the dropped packets. With regard to active-active checkpointing, checkpoints occur whenever a packet miscompare occurs independent of TSB timing and hence can cause real-time deadlines to be missed. A given RT/FT embodiment operates in a manner that avoids the active-passive and active-active checkpointing issues and design requirements discussed herein.

A fault tolerant computer system frequently includes two processor subsystems, generally referred to as the primary and secondary nodes. These nodes either operate substantially synchronously executing the same program in parallel (active-active) or operating with one system, the primary node, actively doing useful computations with the secondary node standing by (active-standby) waiting for a failure of the primary system. If the primary system fails the secondary takes over as the new primary and continues the work of the failing primary, allowing it to be replaced.

General and Specific Computer-Based Implementations and Embodiments

Unless specifically stated otherwise as apparent from the following discussion, it is appreciated that throughout the description, discussions utilizing terms such as "processing" or "computing" or "checkpointing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the disclosure. The examples are intended primarily for purposes of illustration of the disclosure for those skilled in the art. No particular aspect or aspects of the examples are necessarily intended to limit the scope of the disclosure.

The figures and descriptions of the disclosure have been simplified to illustrate elements that are relevant for a clear understanding of the disclosure, while eliminating, for purposes of clarity, other elements. Those of ordinary skill in the art may recognize, however, that these sorts of focused discussions would not facilitate a better understanding of the disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the disclosure, a single component may be replaced by multiple components, and multiple components may be replaced by a single component, to perform a given function or functions. Except where such substitution would not be operative to practice embodiments of the disclosure, such substitution is within the scope of the disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

In various embodiments, one or more techniques, methods, systems, subsystems, and combinations of the foregoing can be implemented using virtualized operating systems, container-based-operating systems, virtualized environments, and various emulators, such as VMware, QEMU, KVM, and others.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A real-time fault tolerant computing system comprising:
   a first computing device comprising
      one or more memory devices,
      one or more processors,
      a first network interface operable to receive device data and transmit output data over a time-slot-based bus, wherein the output data is generated from processing device data, and
      a first real-time checkpoint engine;
   a second computing device comprising
      one or more memory devices,
      one or more processors,
      a second network interface operable to receive device data over the time slot-based bus, and
      a second real-time checkpoint engine; and
   a hardware interconnect operable to permit data exchange between the first computing device and the second computing device,
      wherein checkpoints are generated by the first or the second real-time checkpoint engines during lower-priority communication time slots allocated on the time slot-based bus to avoid interfering with any real-time communications to or from the first and second computing devices.

2. The real-time fault tolerant computing system of claim 1 wherein the first computing device and the second computing device simultaneously process received device data from a device such that if the first computing device experiences a failure, the second computing device continues processing device data to generate the output data and transmit the output data using the time slot-based bus.

3. The real-time fault tolerant computing system of claim 2 wherein checkpoint operations are always postponed until the occurrence of a lower-priority communication slot, even upon the first computing device and the second computing device producing divergent output data prior to the lower-priority communication slot occurring.

4. The real-time fault tolerant computing system of claim 3 wherein the first computing device and the second computing device both delay release of output data to one or more devices in communication with the time-slot based bus until after a subsequent checkpoint to avoid release of divergent output data should a failure occur.

5. The real-time fault tolerant computing system of claim 3, wherein one or more networking programs stored in the one or more memory devices of the first and second computing devices delay and coordinate transmission of output data using one or more of the hardware interconnect, the first network interface and the second network interface.

6. The real-time fault tolerant computing system of claim 2, wherein the first computing device generates checkpoints on a per cycle basis when output data comprising low priority data is transmitted using a low priority time slot.

7. The real-time fault tolerant computing system of claim 2, wherein the device is a sensor and the output data comprises sensor data, the sensor data is operable as an input for a control system.

8. The real-time fault tolerant computing system of claim 2, wherein duration of one or more time slots is increased by a detection period, wherein the detection period ranges from about 1 microsecond to about 100 microseconds.

9. The real-time fault tolerant computing system of claim 2, wherein the first computing device and the second computing device both delay release of output data to devices in communication with the time-slot based bus until after a next checkpoint to avoid release of inconsistent output data.

10. The real-time fault tolerant computing system of claim 9, wherein if the first computing device is operating normally after a checkpoint, the first computing device releases any delayed output data.

11. The real-time fault tolerant computing system of claim 2, wherein the first computing device transmits all of its output data to the second computing device to avoid such output data being dropped upon occurrence of a failure of the first computing device.

12. The real-time fault tolerant computing system of claim 11, wherein if the first computing device fails, the second computing device takes over release of the first computing device's output data that was generated during a last checkpoint.

13. The real-time fault tolerant computing system of claim 2, wherein only the first computing device handles release of output data when no failures have occurred and in parallel shares such output data with the second computing device.

14. The real-time fault tolerant computing system of claim 2, wherein the first computing device and the second computing device receive incoming data directly through a broadcast or a multicast.

15. The real-time fault tolerant computing system of claim 2, wherein each of the first computing device and the second computing device comprise a respective non-virtual operating system (OS) comprising a respective network driver, checkpoint shim, and storage driver stored in the one or more memory devices and executing on each of the one or more processors.

16. The real-time fault tolerant computing system of claim 15, wherein the network driver comprises a replicator in communication with a release coordinator and a release notifier.

17. The real-time fault tolerant computing system of claim 2, wherein each of the first computing device and the second computing device comprise a respective virtual operating system (OS) comprising one or more respective network support applications, a checkpoint engine, and one or more storage support applications stored in the one or more memory devices and executing with respective hypervisors.

18. The real-time fault tolerant computing system of claim 1, wherein the first computing device and the second computing device are both actively processing device data and producing output data so that if the first computing device experiences one or more failure modes, a time delay for second processing device to continue processing is zero.

19. The real-time fault tolerant computing system of claim 1, wherein the device data from one or more devices are transmitted to the first computing device and the second computing device over the time slot-based bus.

20. The system of claim 1, wherein checkpoints are transmitted using the hardware interconnect.

21. A method of controlling an operational system in real-time comprising
receiving device data, at a primary node and a secondary node, from one or more devices in electrical communication with a time slot-based bus, wherein the bus is operable to receive data according to time slots of two or more priority levels;
during a first time slot, generating a checkpoint at primary node and transmitting the checkpoint data to secondary node, wherein the first time slot is a lower priority time slot;
generating an output data at the primary node and the secondary node in response to processing the received device data; and
transmitting, from the primary node, the output data over the bus using a second time slot, wherein the second time slot is a higher priority time slot, wherein both the first node and the second node are in an active mode.

22. The method of claim 21 further comprising transmitting data during a non-checkpoint portion of a lower priority time slot.

23. The method of claim 21 further comprising
gating network data using a respective network software module executing on both the primary and the secondary node such that output data is released from the node whose state has carried forward to current checkpoint.

24. The method of claim 23 further comprising synchronizing transmission of output data with high priority time slots, wherein the output data is received by the operational system.

25. The method of claim 23 further comprising transmitting data during a non-checkpoint portion of a lower priority time slot.

26. The method of claim 21 further comprising transmitting, using the primary node, all of its respective outgoing data to the secondary node to avoid such outgoing data from being dropped upon occurrence of a failure of the primary node.

27. The method of claim 21 further comprising increasing duration of one or more time slots to account for detection of a failure of primary node or secondary node.

28. The method of claim 27 wherein duration of one or more time slots is increased by a detection period, wherein the detection period ranges from about 1 microsecond to about 100 microseconds.

29. The method of claim 21, wherein the checkpoint data is transmitted using a hardware interconnect.

\* \* \* \* \*